(12) United States Patent
Isobe et al.

(10) Patent No.: US 11,837,873 B2
(45) Date of Patent: Dec. 5, 2023

(54) CURRENT RECTIFICATION BASED ON NONCENTROSYMMETRIC QUANTUM MATERIALS

(71) Applicant: Massachusetts Institute of Technology, Cambridge, MA (US)

(72) Inventors: Hiroki Isobe, Cambridge, MA (US); Qiong Ma, Allston, MA (US); Liang Fu, Winchester, MA (US); Nuh Gedik, Watertown, MA (US); Suyang Xu, Allston, MA (US); Pablo Jarillo-Herrero, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 380 days.

(21) Appl. No.: 17/345,078

(22) Filed: Jun. 11, 2021

(65) Prior Publication Data

US 2021/0384762 A1    Dec. 9, 2021

Related U.S. Application Data

(63) Continuation of application No. PCT/US2019/066194, filed on Dec. 13, 2019.
(Continued)

(51) Int. Cl.
*H02J 50/20*    (2016.01)
*H02J 50/27*    (2016.01)
(Continued)

(52) U.S. Cl.
CPC ............ *H02J 50/001* (2020.01); *H02J 50/27* (2016.02); *H02M 1/4208* (2013.01); *H02M 7/04* (2013.01); *B82Y 15/00* (2013.01)

(58) Field of Classification Search
CPC .................................. H02J 50/27; H02J 50/20
See application file for complete search history.

(56) References Cited

U.S. PATENT DOCUMENTS

2011/0121258 A1    5/2011  Hanein et al.
2021/0217952 A1*   7/2021  Jarillo-Herrero ....... G11C 11/22

FOREIGN PATENT DOCUMENTS

CN    105744986 A  *  7/2016  ........... A61B 5/0008
CN    106373968 A     2/2017
(Continued)

OTHER PUBLICATIONS

Sinova et al., "Spin Hall effects." Reviews of Modern Physics 87.4 (2015): 1213. 47 pages.
(Continued)

*Primary Examiner* — Sisay G Tiku
(74) *Attorney, Agent, or Firm* — Smith Baluch LLP

(57) ABSTRACT

Rectification is a process that converts electromagnetic fields into direct current (DC). Such a process underlies a wide range of technologies, including wireless communication, wireless charging, energy harvesting, and infrared detection. Existing rectifiers are mostly based on semiconductor diodes, with limited applicability to small voltages or high frequency inputs. Here, we present an alternative approach to current rectification that uses the electronic properties of quantum crystals without semiconductor junctions. We identify a new mechanism for rectification from skew scattering due to the chirality of itinerant electrons in time-reversal-invariant but inversion-breaking materials. Our calculations reveal large, tunable rectification effects in graphene multilayers and transition metal dichalcogenides. These effects can be used in high-frequency rectifiers by rational material design and quantum wavefunction engineering.

20 Claims, 14 Drawing Sheets

Related U.S. Application Data

(60) Provisional application No. 62/779,025, filed on Dec. 13, 2018.

(51) Int. Cl.
  H02J 50/00 (2016.01)
  H02M 1/42 (2007.01)
  H02M 7/04 (2006.01)
  B82Y 15/00 (2011.01)

(56) References Cited

FOREIGN PATENT DOCUMENTS

| CN | 106521630 A | 3/2017 | | |
|---|---|---|---|---|
| CN | 109923387 A | * | 6/2019 | ............ H01L 35/02 |
| EP | 3552299 B1 | * | 12/2020 | ............ H01L 31/09 |
| WO | WO-2018104898 A1 | * | 6/2018 | ............ H01L 31/09 |
| WO | WO-2020123920 A1 | * | 6/2020 | ............ H02J 50/001 |

OTHER PUBLICATIONS

Smit, "The spontaneous Hall effect in ferromagnetics I." Physica 21.6-10 (1955): 877-887.
Smit, "The spontaneous Hall effect in ferromagnetics II." Physica 24.1-5 (1958): 39-51.
Sodemann et al., "Quantum nonlinear Hall effect induced by Berry curvature dipole in time-reversal invariant materials." Physical Review Letters 115.21 (2015): 216806. 5 pages.
Wallace, "The band theory of graphite." Physical Review 71.9 (1947): 622. 13 pages.
Wang et al., "One-dimensional electrical contact to a two-dimensional material." Science 342.6158 (2013): 614-617.
Xiao et al., "Berry phase effects on electronic properties." Reviews of Modern Physics 82.3 (2010): 1959. 49 pages.
Xu et al., "Electrically switchable Berry curvature dipole in the monolayer topological insulator WTe 2." Nature Physics 14.9 (2018): 900-906. 8 pages.
Xue et al., "Scanning tunnelling microscopy and spectroscopy of ultra-flat graphene on hexagonal boron nitride." Nature Materials 10.4 (2011): 282-285.
Yankowitz et al., "Dynamic band-structure tuning of graphene moire superlattices with pressure." Nature 557.7705 (2018): 404-408.
Yankowitz et al., "Emergence of superlattice Dirac points in graphene on hexagonal boron nitride." Nature Physics 8.5 (2012): 382-386.
Zhu et al., "Graphene geometric diodes for terahertz rectennas," J. Phys. D-Appl. Phys. 46(18), 185101 (2013), 6 pages.
Adams et al., "Energy bands in the presence of an external force field-II: Anomalous velocities." Journal of Physics and Chemistry of Solids 10.4 (1959): 286-303.
Ando, "Screening effect and impurity scattering in monolayer graphene." Journal of the Physical Society of Japan 75.7 (2006): 074716-074716.
Auton et al., "Graphene ballistic nano-rectifier with very high responsivity," Nature Communications 7, 11670 (2016), 6 pages.
Belinicher, "Photogalvanic effect in a crystal with polar axis." Soviet Journal of Experimental and Theoretical Physics 46 (1977): 362. 5 pages.
Belinicher et al., "The photogalvanic effect in media lacking a center of symmetry." Soviet Physics Uspekhi 23.3 (1980): 199. 26 pages.
Berger, "Side-jump mechanism for the Hall effect of ferromagnets." Physical Review B 2.11 (1970): 4559. 8 pages.
Boyd, "The nonlinear optical susceptibility." Nonlinear Optics 3 (2008): 1-67.
Carminati et al., "Reciprocity, unitarity, and time-reversal symmetry of the S matrix of fields containing evanescent components." Physical Review A 62.1 (2000): 012712. 7 pages.
Chakraborty et al., "Optical antenna enhanced graphene photodetector," Appl. Phys. Lett. 105(24), 241114 (2014). 4 pages.

Dean et al., "Boron nitride substrates for high-quality graphene electronics." Nature Nanotechnology 5.10 (2010): 722-726.
Deyo et al., "Semiclassical theory of the photogalvanic effect in non-centrosymmetric systems." arXiv preprint arXiv:0904.1917 (2009). 7 pages.
Dillon et al., "The symmetry of the theoretical optical potential and its connection with time reversal and reciprocity." Nuclear Physics A 114.3 (1968): 623-628.
Dresselhaus et al., "Intercalation compounds of graphite." Advances in Physics 51.1 (2002): 1-186.
Fu, "Hexagonal warping effects in the surface states of the topological insulator Bi 2 Te 3." Physical Review Letters 103.26 (2009): 266801. 4 pages.
Guinea et al., "Electronic states and Landau levels in graphene stacks." Physical Review B 73.24 (2006): 245426. 8 pages.
Huang et al., "Highly Flexible and Conductive Printed Graphene for Wireless Wearable Communications Applications," Sci. Rep. 5, 18298 (2015), 8 pages.
Hunt et al., "Massive Dirac fermions and Hofstadter butterfly in a van der Waals heterostructure." Science 340.6139 (2013): 1427-1430.
International Search Report and Written Opinion in International Patent Application No. PCT/US2019/066194 dated Feb. 19, 2020, 11 pages.
Ishizuka et al., "Noncommutative quantum mechanics and skew scattering in ferromagnetic metals." Physical Review B 96.16 (2017): 165202. 5 pages.
Isobe et al., "High-frequency rectification via chiral Bloch electrons." arXiv preprint arXiv:1812.08162 (2018). 24 pages.
Kang et al., "Observation of the nonlinear anomalous Hall effect in 2D WTe2." arXiv preprint arXiv:1809.08744 (2018). 19 pages.
Karplus et al., "Hall effect in ferromagnetics." Physical Review 95.5 (1954): 1154. 7 pages.
King-Smith et al., "Theory of polarization of crystalline solids." Physical Review B 47.3 (1993): 1651. 4 pages.
Kohn et al., "Quantum theory of electrical transport phenomena." Physical Review 108.3 (1957): 590. 22 pages.
Luttinger et al., "Quantum theory of electrical transport phenomena. II." Physical Review 109.6 (1958): 1892. 18 pages.
Luttinger, "Theory of the Hall effect in ferromagnetic substances." Physical Review 112.3 (1958): 739. 13 pages.
McCann et al., "Landau-level degeneracy and quantum Hall effect in a graphite bilayer." Physical Review Letters 96.8 (2006): 086805. 4 pages.
McCann et al., "The electronic properties of bilayer graphene." Reports on Progress in Physics 76.5 (2013): 056503. 23 pages.
Mittendorff et al., "Ultrafast graphene-based broadband THz detector," Appl. Phys. Lett. 103(2), 021113 (2013). 4 pages.
Moore et al., "Confinement-induced Berry phase and helicity-dependent photocurrents." Physical Review Letters 105.2 (2010): 026805. 4 pages.
Morimoto et al., "Nonreciprocal current from electron interactions in noncentrosymmetric crystals: roles of time reversal symmetry and dissipation." Scientific Reports 8.1 (2018): 1-16.
Mucha-Kruczyński et al., "Electron-hole asymmetry and energy gaps in bilayer graphene." Semiconductor Science and Technology 25.3 (2010): 033001. 7 pages.
Nagaosa et al., "Anomalous hall effect." Reviews of Modern Physics 82.2 (2010): 1539. 54 pages.
Neto et al., "The electronic properties of graphene." Reviews of Modern Physics 81.1 (2009): 109. 54 pages.
Nozieres et al., "A simple theory of the anomalous Hall effect in semiconductors." Journal de Physique 34.10 (1973): 901-915.
Ohta et al., "Controlling the electronic structure of bilayer graphene." Science 313.5789 (2006): 951-954.
Olbrich et al., "Room-temperature high-frequency transport of Dirac fermions in epitaxially grown Sb 2 Te 3-and Bi 2 Te 3-based topological insulators." Physical Review Letters 113.9 (2014): 096601. 5 pages.
Onoda et al., "Quantum transport theory of anomalous electric, thermoelectric, and thermal Hall effects in ferromagnets." Physical Review B 77.16 (2008): 165103. 20 pages.

(56) References Cited

OTHER PUBLICATIONS

Onoda et al., "Theory of Non-Equilibirum States Driven by Constant Electromagnetic Fields:—Non-Commutative Quantum Mechanics in the Keldysh Formalism -." Progress of Theoretical Physics 116.1 (2006): 61-86.

Park et al., "New generation of massless Dirac fermions in graphene under external periodic potentials." Physical Review Letters 101.12 (2008): 126804. 4 pages.

Qian et al., "Quantum spin Hall effect in two-dimensional transition metal dichalcogenides." Science 346.6215 (2014): 1344-1347.

Saeed et al., "Graphene-based Rectifier circuits," Carbohagen 2016: 7th symposium on carbon and related nanomaterials, Copenhagen, Aug. 17-18, 2016, 1 page.

Sarma et al., "Electronic transport in two-dimensional graphene." Reviews of Modern Physics 83.2 (2011): 407. 64 pages.

Schliemann et al., "Anisotropic transport in a two-dimensional electron gas in the presence of spin-orbit coupling." Physical Review B 68.16 (2003): 165311. 9 pages.

Schmitz et al., "High mobility dry-transferred CVD bilayer graphene." Applied Physics Letters 110.26 (2017): 263110. 6 pages.

Seifert et al., "Photo-induced anomalous Hall effect in the type-II Weyl-semimetal WTe2 at room-temperature." arXiv preprint arXiv:1810.01510 (2018). 8 pages.

Sinitsyn et al., "Anomalous Hall effect in a two-dimensional Dirac band: The link between the Kubo-Streda formula and the semiclassical Boltzmann equation approach." Physical Review B 75.4 (2007): 045315. 17 pages.

Sinitsyn et al., "Coordinate shift in the semiclassical Boltzmann equation and the anomalous Hall effect." Physical Review B 73.7 (2006): 075318. 6 pages.

Sinitsyn et al., "Disorder effects in the anomalous Hall effect induced by Berry curvature." Physical Review B 72.4 (2005): 045346. 11 pages.

Sinitsyn, "Semiclassical theories of the anomalous Hall effect." Journal of Physics: Condensed Matter 20.2 (2007): 023201. 18 pages.

\* cited by examiner

Pink is graphene
Blue is BN

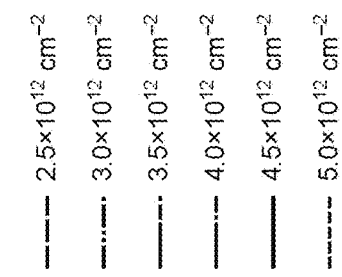
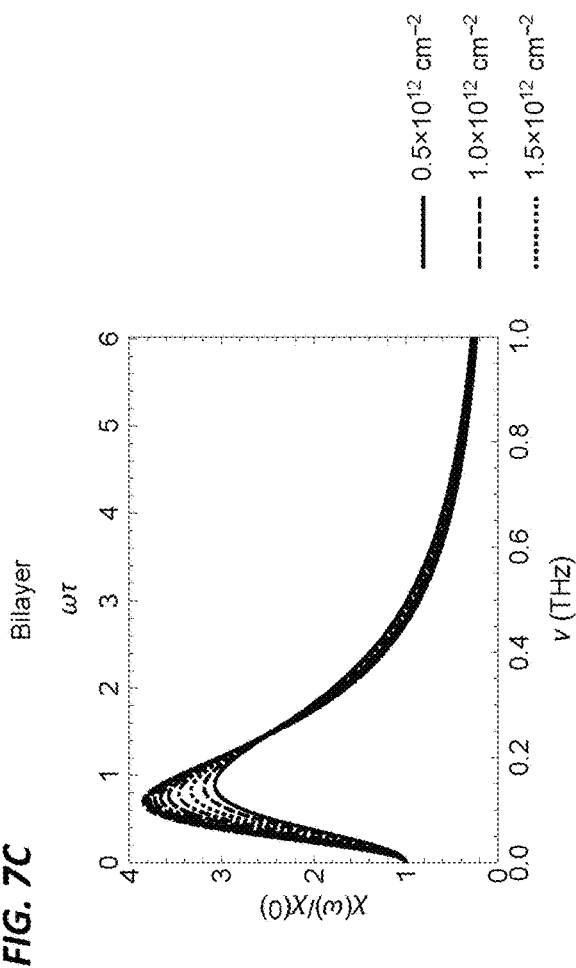
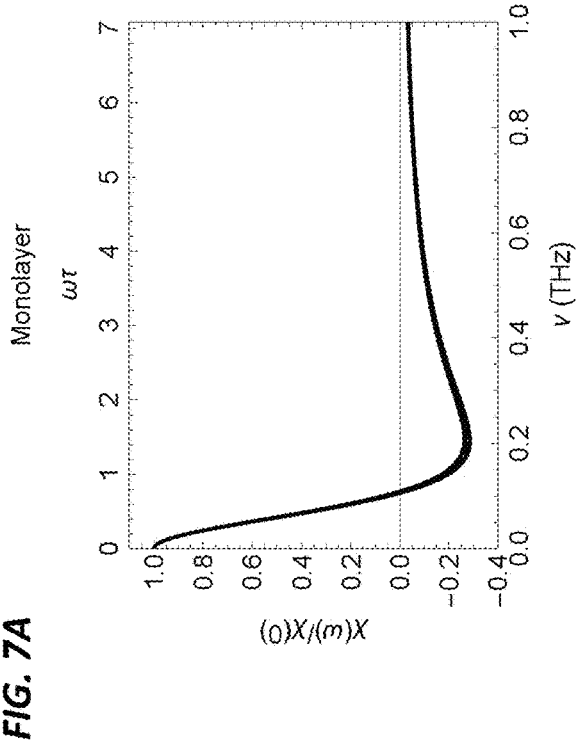
FIG. 7A
FIG. 7B
FIG. 7C
FIG. 7D
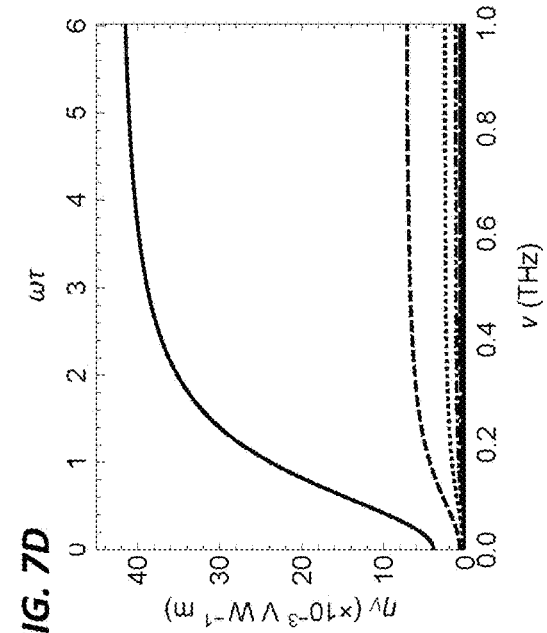
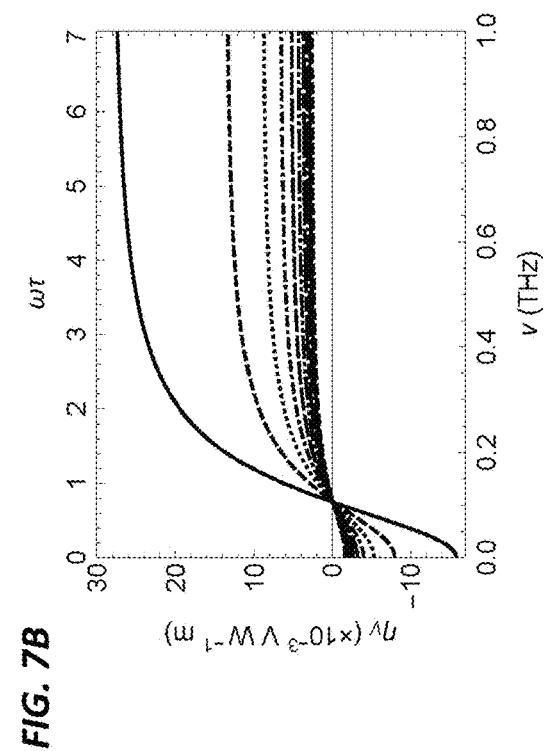

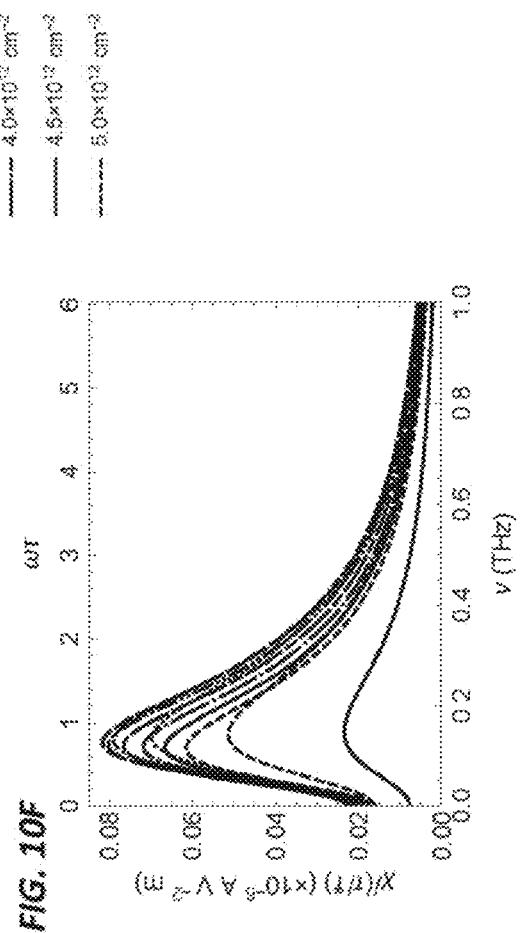
FIG. 10E
FIG. 10F
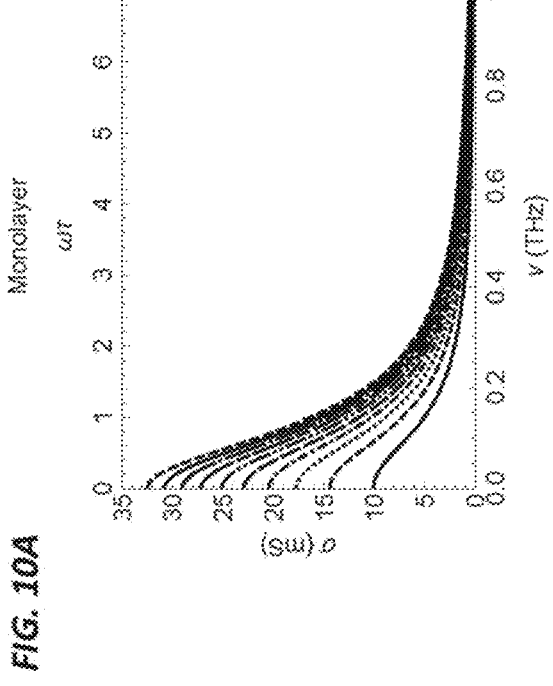
FIG. 10A
FIG. 10B

CURRENT RECTIFICATION BASED ON NONCENTROSYMMETRIC QUANTUM MATERIALS

CROSS-REFERENCE TO RELATED APPLICATION(S)

This application is a bypass continuation of International Application No. PCT/US2019/066194, filed Dec. 13, 2019, which claims priority, under 35 U.S.C. § 119(e), to U.S. Application No. 62/779,025, filed Dec. 13, 2018. Each of these applications is incorporated herein by reference in its entirety for all purposes.

GOVERNMENT SUPPORT STATEMENT

This invention was made with government support under DE-SC0001088 awarded by the U.S. Department of Energy, FA9550-16-1-0382 awarded by the Air Force Office of Scientific Research, and DMR-0819762, DMR-1231319, and DMR-1809815 awarded by the National Science Foundation. The government has certain rights in the invention.

BACKGROUND

Due to the explosive growth of wireless technologies and portable devices, there is now increasing effort towards developing micro-scale devices that can harvest ambient energy into usable electrical energy. Because of fast-developing microwatt and nanowatt electronics and next-generation wireless networks, there is a large demand for energy harvesters that can harvest energy from electromagnetic fields in the microwave and terahertz (THz) frequency range. High-frequency rectifiers can also be used in sensor and detector technology for the infrared, far infrared and submillimeter bands, which has wide-ranging applications in medicine, biology, climatology, meteorology, telecommunication, astronomy, etc. However, there is a so-called terahertz gap (0.1 to 10 THz) between the operating frequencies of electrical diodes and photodiodes. At frequencies within this range, efficient detection technology remains to be developed.

The physical process central to harvesting electromagnetic energy is rectification, which refers to the conversion from an oscillating electromagnetic field to a direct current (DC). Existing rectifiers operating at radio frequencies are mostly based on electrical circuits with diodes, where the built-in electric field in the semiconductor junction sets the direction of the DC current. But diodes face two fundamental limitations when used to rectify an alternating current (AC). First, rectification by a diode requires a threshold input voltage $V_T = k_B T/e$, where $k_B$ is Boltzmann's constant, T is temperature, and e is the charge of an electron, This voltage is known as the thermal voltage and is about 26 meV at room temperature. Second, the responsivity is limited by the transition time in diodes, which is typically on the order of nanoseconds and drops at high frequencies, limiting the operating frequency of diode-based rectifiers.

Instead of using a semiconductor junction, rectification can be realized as the nonlinear electrical or optical response of a noncentrosymmetric crystal. In particular, the second-order nonlinearity $\chi(\omega)$ is an intrinsic material property that characterizes the DC current generated by an external electric field oscillating at frequency $\omega$. Rectification in a single homogenous material is not limited by the thermal voltage threshold or the transition time that limits the responsivity of a semiconductor junction. Moreover, the nonlinear electrical and optical responses of metals and degenerate semiconductors are much faster than photothermal effects used in bolometers for thermal radiation detection. This means that a rectifier based on a noncentrosymmetric crystal could be used to sense high-frequency (e.g., THz) radiation at higher speeds than a bolometer.

However, the second-order nonlinearity of most materials is small. While nonlinear optical properties of quantum materials, such as photocurrent and second-harmonic generation, have been studied extensively, much less is known about second-order responses at radio, microwave, or infrared frequencies. Recent works have predicted intra-band photocurrents and second-order nonlinear Hall effects due to "Berry curvature dipoles" in nonmagnetic materials at zero magnetic field. In particular, the nonlinear Hall effect is predicted to be prominent in materials with tilted Dirac or Weyl cones, which are sources of large Berry curvature dipoles. Very recently, this effect was observed in low-frequency (around 100 Hz) transport measurements on the two-dimensional (2D) transition metal dichalcogenide (TMD) 1T'-WTe$_2$. The second-order Hall conductivity of bilayer WTe$_2$ is remarkably large, in agreement with its large Berry curvature dipole from the tilted Dirac dispersion. This and other types of nonlinear response from intra-band processes are also being explored in topological insulator surface states, Weyl semimetals, Rashba systems and heavy fermion materials.

SUMMARY

Here, we present current rectifiers that use the nonlinear electric and terahertz response of noncentrosymmetric crystals. Unlike other current rectifiers, the inventive current rectifiers do not include diodes or other (semiconductor) junction structures. Instead, they operate by exploiting the second-order nonlinear response of a patch of noncentrosymmetric material. This patch of noncentrosymmetric material is coupled to an antenna, which receives an alternating current (AC) electric field. The antenna couples this AC electric field into the patch of noncentrosymmetric material, which generates a net DC current from the AC electric field via second-order skew scattering. A pair of electrodes electrically connected to the patch of noncentrosymmetric material conduct this DC current to a load.

Without being bound by any particular theory, the large and highly tunable rectification effects in graphene multilayers, heterostructures, and 2H-TMD monolayers can be explained from the intra-band second-order response in time-reversal-invariant noncentrosymmetric materials using a semiclassical Boltzmann equation and taking account of electron Bloch wavefunctions via quantum-mechanical scattering rates. Skew scattering with nonmagnetic impurities contributes to rectification. This skew scattering arises from the chirality of Bloch wavefunctions in momentum space and does not require spin-orbit coupling. The contributions to rectification from skew scattering and from Berry curvature dipole scale differently with the impurity concentration, and skew scattering predominates at low impurity concentration. Moreover, skew scattering is allowed in all noncentrosymmetric crystals, whereas Berry curvature dipole requires more strict symmetry conditions.

An example current rectifier may include a patch of a noncentrosymmetric material that is electrically coupled to an antenna and to a pair of electrodes. In operation, the antenna receives an alternating current (AC) electric field and couples it into the noncentrosymmetric material. The noncentrosymmetric material generates a direct current (DC) current via a second-order nonlinear response to the AC electric field. And the electrodes conduct the DC current out of the noncentrosymmetric material.

The AC electric field may oscillate at a frequency from about 0.1 THz to about 10 THz. The AC electric field may oscillate in a first direction in a plane of the noncentrosymmetric material and the DC current may flow from the noncentrosymmetric material in a second direction orthogonal to the first direction and in the plane of the noncentrosymmetric material. Alternatively, the AC electric field may oscillate and the DC current may flow in the same direction in a plane of the noncentrosymmetric material.

In either case, the noncentrosymmetric material may lack symmetry in a direction perpendicular to a plane of the noncentrosymmetric material. The noncentrosymmetric material may have a band gap of about 26 meV at room temperature (e.g., about 300 K). The noncentrosymmetric can generate the DC current from the AC electric field at room temperature.

The noncentrosymmetric material may include a graphene monolayer disposed on a dielectric layer that breaks an inversion symmetry of the graphene monolayer. Alternatively, the noncentrosymmetric material may include a graphene bilayer, in which case the current rectifier may further include first and second insulators and first and second gate electrodes. The first insulator layer is disposed on a first side of the graphene bilayer, and the second insulator layer is disposed on a second side of the graphene bilayer opposite the first side of the graphene bilayer. The first gate electrode is on a far side of the first insulator layer from the graphene bilayer and applies a first gate voltage to the graphene bilayer. And the second gate electrode is on a far side of the second insulator layer from the graphene bilayer and applies a second gate voltage to the graphene bilayer. The first and second gate voltages break an inversion symmetry of the graphene bilayer. The noncentrosymmetric material may also comprise a transition metal dichalcogenide.

All combinations of the foregoing concepts and additional concepts discussed in greater detail below (provided such concepts are not mutually inconsistent) are part of the inventive subject matter disclosed herein. In particular, all combinations of claimed subject matter appearing at the end of this disclosure are part of the inventive subject matter disclosed herein. The terminology used herein that also may appear in any disclosure incorporated by reference should be accorded a meaning most consistent with the particular concepts disclosed herein.

BRIEF DESCRIPTIONS OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIG. 7A is a plot of the second-order conductivity ω for a graphene monolayer heterostructure.

FIG. 7B is a plot of the reduced voltage responsivity $\eta_V$ for a graphene monolayer heterostructure.

FIG. 7C is a plot of the second-order conductivity ω for a graphene bilayer heterostructure.

FIG. 7D is a plot of the reduced voltage responsivity $\eta_V$ for a graphene bilayer heterostructure.

FIG. 10A is a plot of the linear conductivity σ of monolayer graphene versus frequency for carrier densities ranging from $0.5 \times 10^{12}$ cm$^{-2}$ (bottom trace) to $5 \times 10^{12}$ cm$^{-2}$ (top trace) and a temperature of zero degrees Kelvin.

FIG. 10B is a plot of the second-order conductivity χ of monolayer graphene versus frequency for carrier densities ranging from $0.5 \times 10^{12}$ cm$^{-2}$ to $5 \times 10^{12}$ cm$^{-2}$ and a temperature of zero.

FIG. 10E is a plot of the linear conductivity σ of bilayer graphene versus frequency for carrier densities ranging from $0.5 \times 10^{12}$ cm$^{-2}$ (bottom trace) to $5 \times 10^{12}$ cm$^{-2}$ (top trace) and a temperature of zero degrees Kelvin.

FIG. 10F is a plot of the second-order conductivity χ of bilayer graphene versus frequency for carrier densities ranging from $0.5 \times 10^{12}$ cm$^{-2}$ to $5 \times 10^{12}$ cm$^{-2}$ and a temperature of zero.

FIG. 12E is a logarithmic-scale plot of the linear conductivity σ of bilayer graphene versus frequency and temperature for a carrier density n=$1 \times 10^{12}$ cm$^{-2}$.

DETAILED DESCRIPTION

Figure 1B:
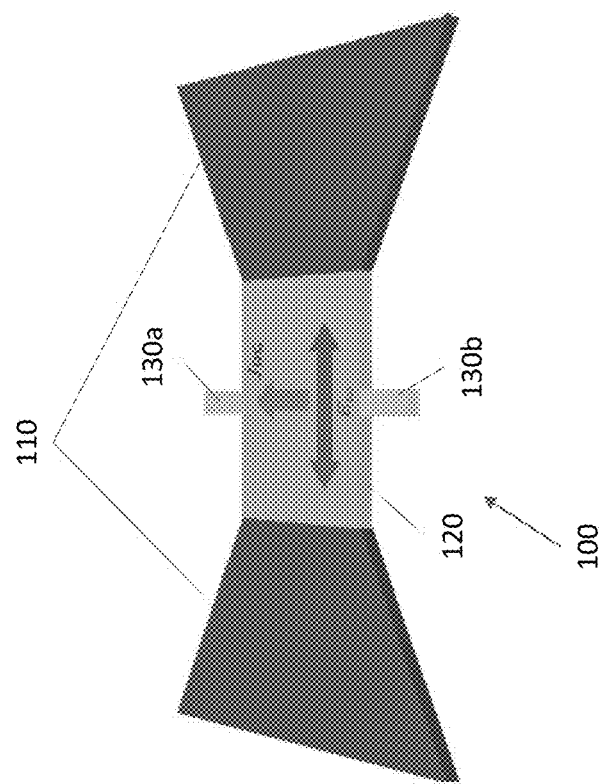
FIGS. 1A and 1B show a high-frequency (e.g., THz) current rectifier with a noncentrosymmetric quantum material that converts an oscillating electric field into a transverse DC current.
Figure 1A:
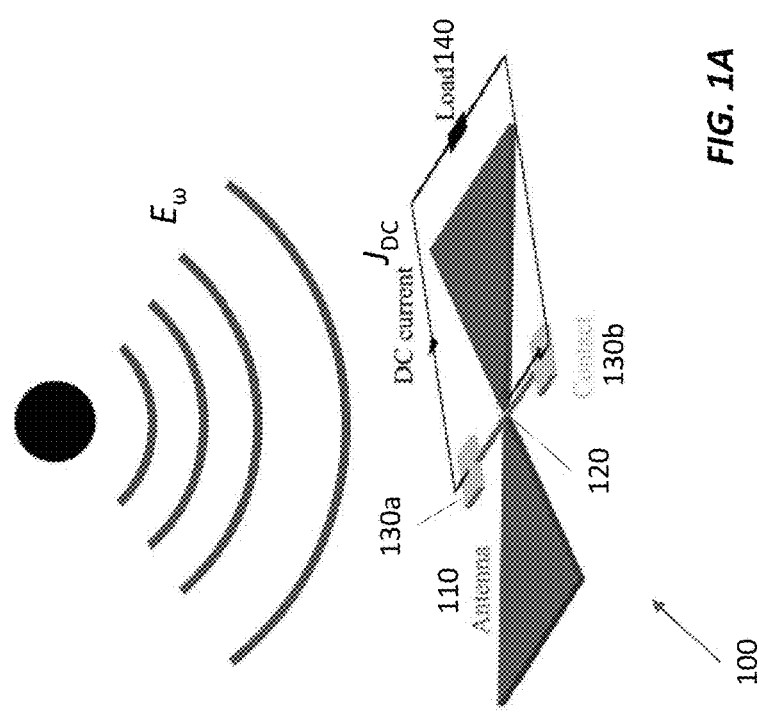

FIGS. 1A and 1B illustrate a current rectifier 100 that can rectify radio-frequency and terahertz electric fields (e.g., alternating current (AC) electric fields oscillating at 0.1 THz to 10 Hz). The current rectifier 100 includes an antenna 100 that is coupled to a thin patch of noncentrosymmetric material 120, which in turn is coupled to a pair of electrodes 130a and 130b (collectively, electrodes 130). The electrodes 130 connect the rectifier 100 to a load 140, which may have an impedance of ohms to kiloohms. In principle, there is no high-frequency coupling to these electrodes 130, but they may be DC-coupled (e.g., using a low-pass filter) to remove high-frequency electric field components and pass DC current.

In this example, the patch of noncentrosymmetric material 120 is rectangular, with two halves of the antenna 110 are coupled to one pair of opposing edges and the electrodes 130 coupled to the other pair of opposing edges. The antenna 110, noncentrosymmetric material 120, and electrodes 130 can be deposited on any suitable dielectric substrate (e.g., a silicon oxide substrate). Notably, this current rectifier 100 does not include or form a diode.

The antenna 110 is shown in FIGS. 1A and 1B as a bowtie antenna but could take any other suitable shape. It is made of metal or another conductive material and is configured to detect linearly polarized incident electric fields. For example, the bowtie antenna 110 has a long axis stretching horizontally in FIG. 1B and is configured to detect a horizontally polarized electric field, as indicated by the double-headed arrow representing the electric field oscillation direction in FIG. 1B. If the incident electric field is not linearly polarized along the bowtie antenna's long axis—for example, if the incident electric field is unpolarized or elliptically polarized—then the bowtie antenna 110 couples the horizontal projection of the incident electric field into the noncentrosymmetric material 120.

The noncentrosymmetric material 120 can include a two-dimensional material, such as monolayer graphene, bilayer graphene, multi-layer graphene, or a transition metal dichalcogenide, or a three-dimensional material, such as a bulk transition metal dichalcogenide or a Weyl semimetal without inversion (e.g., tantalum arsenide (TaAs)). It is formed in a roughly planar rectangular patch whose dimensions can be about 1-10 μm wide to about 1-10 μm long to about 10-100 nm thick. The patch may be formed in other shapes (e.g., another polygon) so long as the noncentrosymmetric material 120 is coupled to the antenna 110 and electrodes 130. As explained in greater detail below, this patch may include multiple layers, including dielectric layers and/or additional electrodes that break the inversion symmetry of a two-dimensional material.

The noncentrosymmetric material 120 lacks inversion symmetry along an axis parallel to the DC current. This axis is generally, but not always, perpendicular to the noncentrosymmetric material's largest surface (i.e., along the propagation direction of a normally incident electric field). For the transverse response illustrated in FIG. 1B, the noncentrosymmetric material 120 lacks inversion symmetry along an axis perpendicular to the electric field oscillation direction.

In operation, the antenna 110 couples an incident electric field $E_\omega$ into the noncentrosymmetric material 120, which exhibits a second-order nonlinear response to the incident electric field $E_\omega$, as explained in greater detail below. More specifically, skew scattering by the lattice of the noncentrosymmetric material 120 produces a net DC current $J_{DC}$. In the rectifier 100 shown in FIGS. 1A and 1B, this scattering is transverse—that is, the DC current $J_{DC}$ propagates in a direction that is perpendicular to the oscillation direction (indicated by the double-headed arrow in FIG. 1B) of the electric field $E_\omega$. The current direction is set by the polarization of the electric field $E_\omega$ and the crystal asymmetry. The DC current $J_{DC}$ flows within the layer of noncentrosymmetric material 120 to the load 140 via the electrodes 130.

Figure 2:
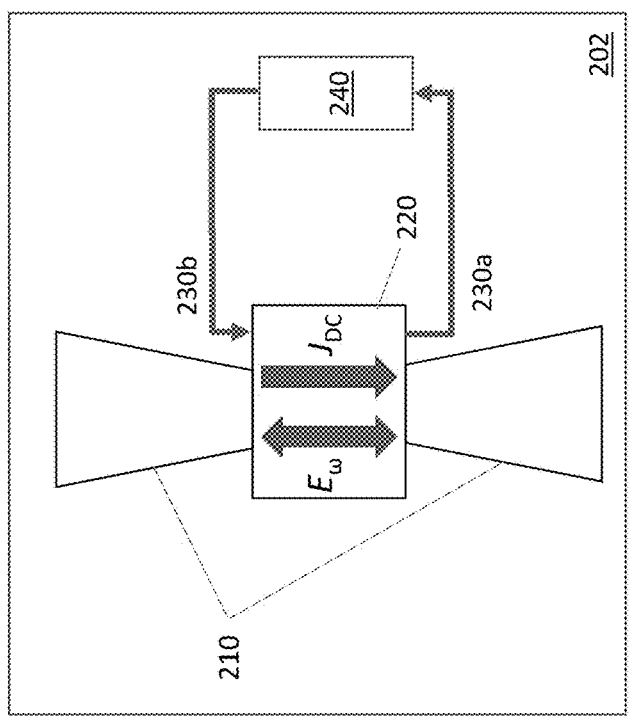
FIG. 2 shows a high-frequency (e.g., THz) current rectifier with a noncentrosymmetric quantum material that converts an oscillating electric field into a longitudinal DC current.

FIG. 2 shows a current rectifier 200 that generates a "longitudinally" propagating rectified current that $J_{DC}$ from a high-frequency (e.g., 0.1-10 THz) electric field $E_\omega$. Like the current rectifier 100 in FIGS. 1A and 1B, this current rectifier 200 includes an antenna 210; a thin, rectangular patch of noncentrosymmetric material 220; and electrodes 230a and 230b (collectively, electrodes 230) on a substrate 202. The electrodes 230 are electrically connected to a load 240, which may also be on the same substrate 202 as the current rectifier 200. In this case, however, the antenna elements and electrodes 230 are coupled to the same sides of the noncentrosymmetric material 220.

In operation, the antenna 210 couples the electric field $E_\omega$ into the noncentrosymmetric material 220 such that the electric field $E_\omega$ oscillates in the direction indicated by the double-headed arrow in FIG. 2. Again, the noncentrosymmetric material 220 generates a net DC current $J_{DC}$ in response to the electric field $E_\omega$ via a second-order skew scattering response. In this case, however, the DC current $J_{DC}$ propagates in a direction parallel to the electric field $E_\omega$ oscillation direction. The DC current $J_{DC}$ flows within the plane of noncentrosymmetric material 220 to the load 240 via the electrodes 230.

Figure 4:
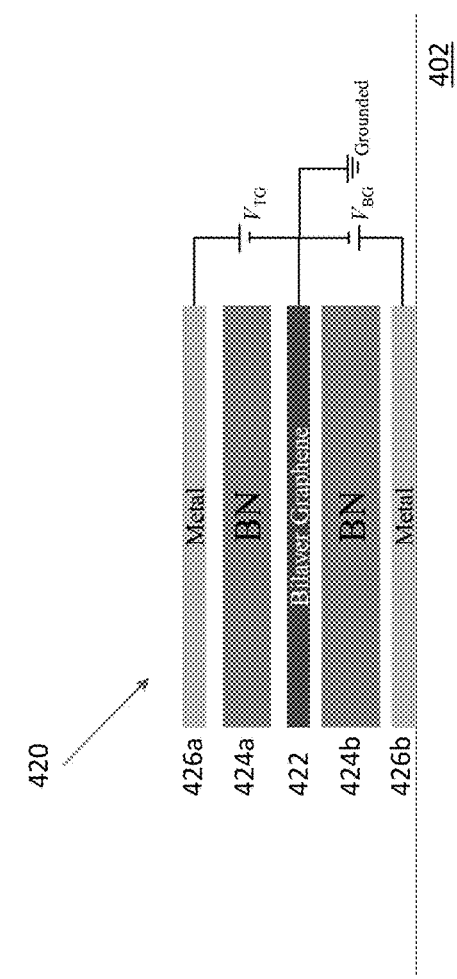
FIG. 4 is a side view of a noncentrosymmetric quantum material formed of a bilayer graphene stack whose inversion symmetry is broken by an applied bias electric field.
Figure 3B:
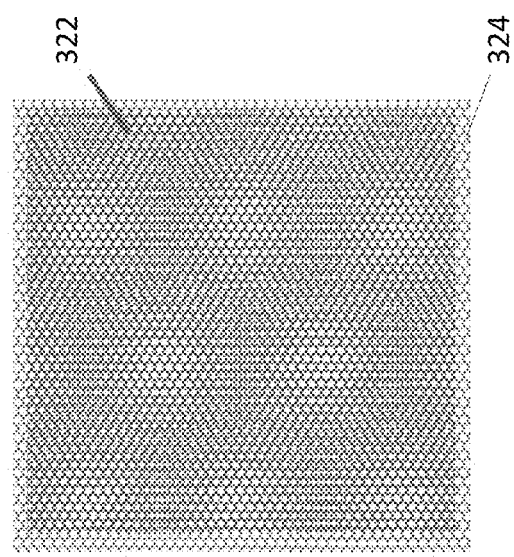
FIG. 3B is a top view of the monolayer graphene/dielectric heterostructure of FIG. 3A.
Figure 3A:
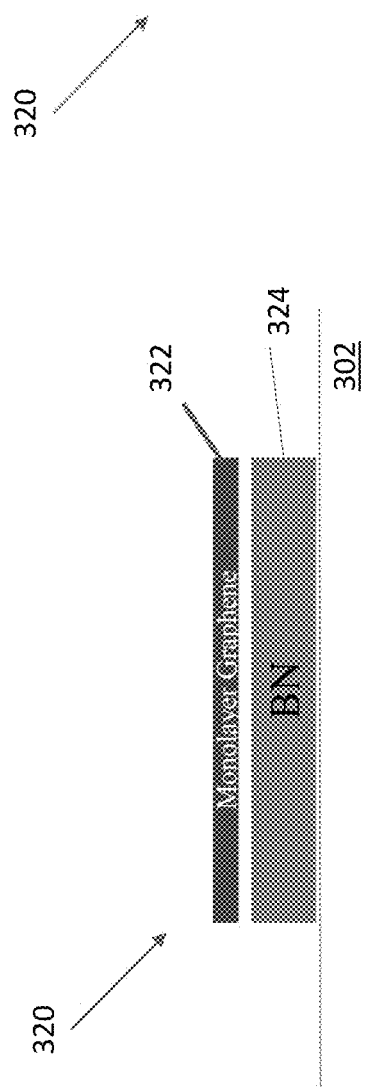
FIG. 3A is a side view a noncentrosymmetric quantum material formed of a monolayer graphene/dielectric heterostructure where the monolayer graphene's inversion symmetry is broken by a dielectric layer.

FIGS. 3A, 3B, and 4 show different examples of noncentrosymmetric heterostructures suitable for use as the noncentrosymmetric materials in the current rectifiers shown in FIGS. 1A, 1B, and 2. More specifically, FIGS. 3A and 3B show side and top views, respectively, of a noncentrosymmetric heterostructure 320 formed of monolayer graphene 322 on a layer of dielectric boron nitride (BN) 324 on a substrate 302. This heterostructure 320 may be up to about 100 nm thick. By itself, the monolayer graphene 322 has inversion symmetry. The lattice mismatch between the monolayer graphene 322 and the BN layer 324 breaks the monolayer graphene's inversion symmetry, causing the heterostructure 320 to be noncentrosymmetric. (A layer of silicon carbide (SiC) can be used instead of the BN layer 324 to break the monolayer graphene's inversion symmetry.)

FIG. 4 is a side view of a noncentrosymmetric heterostructure 420 with bilayer graphene 422 sandwiched between a pair of BN layers 424a and 424b (collectively, BN layers 424), which are themselves sandwiched between a pair of electrodes 426a and 426b (collectively, electrodes 426). Each BN layer 424a, 424b may be about 10-30 nm thick (e.g., 20 nm) and can have different thicknesses (i.e., the upper BN layer 424a can be thicker or thinner than the lower BN layer 424b). Together, the bilayer graphene 422, BN layers 424, and electrodes 426 form a double capacitive structure on a substrate 402.

Like monolayer graphene, the bilayer graphene 422 has inversion symmetry. This inversion symmetry is broken by applying bias fields $V_{BG}$ and $V_{TG}$ to the upper and lower layers of the bilayer graphene 422 with the electrodes 426. These bias fields are orthogonal to the surface of the substrate 402, to the polarization of the incident (AC) electric field, and to the rectified current. The bias fields generate a displacement field with the graphene bilayer 422 that are roughly proportional to $(V_{BG}/d_1 - V_{TG}/d_2)$, where $d_1$ is the thickness of the upper BN layer 424a and $d_2$ is the thickness of the lower BN layer 424b. The displacement field amplitude can range from about −1.5 V/nm to about +1.5 V/nm for applied voltages on the order of 2 V. The applied voltages and BN layer thicknesses are also selected based on the desired carrier density within the bilayer graphene 422. This carrier density is proportional to $(V_{BG}/d_1 + V_{TG}/d_2)$ and may be about $\pm 10^{13}$ cm$^{-2}$.

Figure 5C:
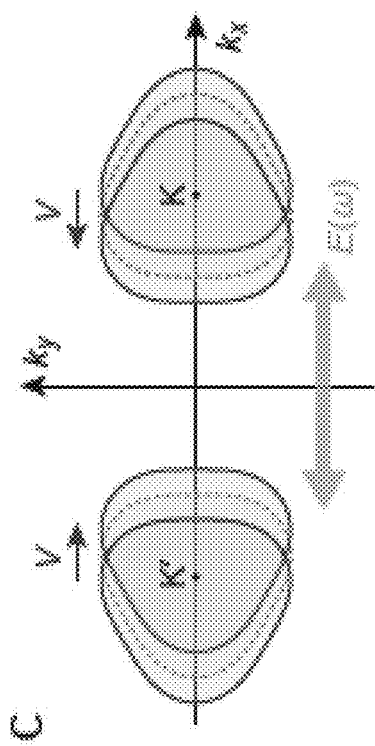
FIG. 5C illustrates Fermi surface displacement at frequency ω (green) for transverse ($\chi_{yxx}$) skew scattering on a honeycomb lattice.
Figure 5D:
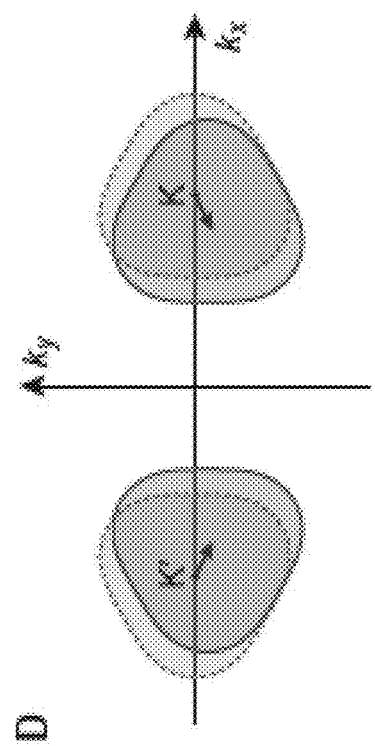
FIG. 5D illustrates stationary Fermi surface displacement for transverse ($\chi_{yxx}$) skew scattering on a honeycomb lattice.
Figure 5A:
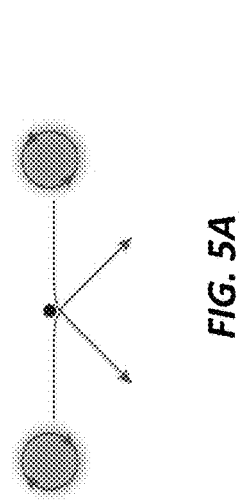
FIG. 5A illustrates transverse ($\chi_{yxx}$) skew scattering on a honeycomb (e.g., graphene) lattice.
Figure 5B:
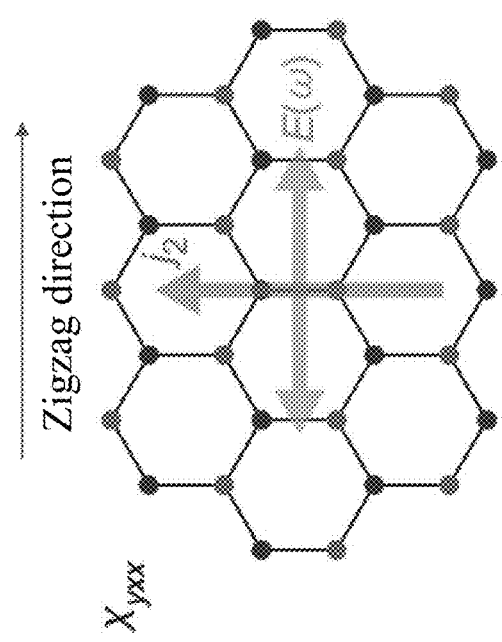
FIG. 5B illustrates the electric field and rectified current for transverse ($\chi_{yxx}$) skew scattering on a honeycomb lattice.
Figure 6C:
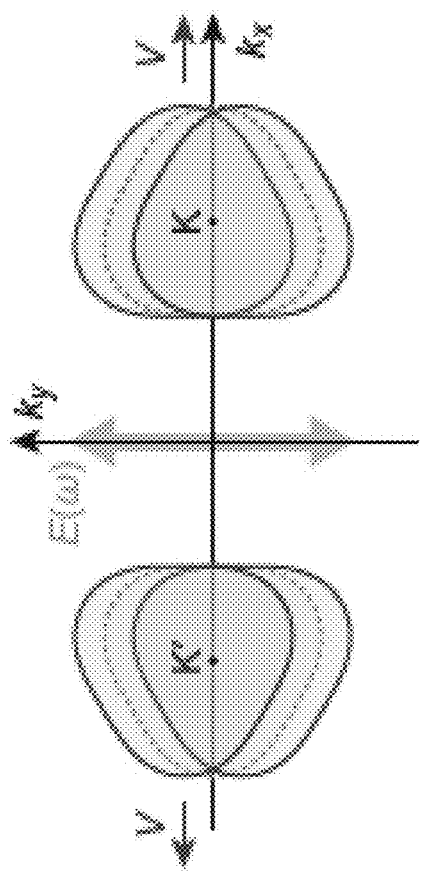
FIG. 6C illustrates Fermi surface displacement at frequency ω (green) for longitudinal ($\chi_{yyy}$) skew scattering on a honeycomb lattice.
Figure 6D:
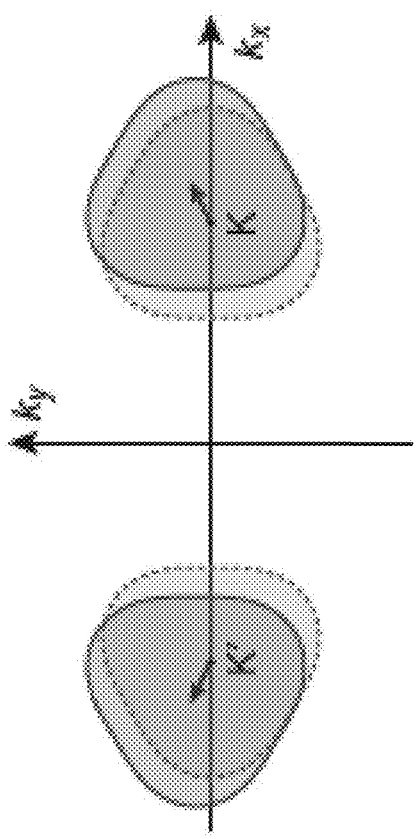
FIG. 6D illustrates stationary Fermi surface displacement for longitudinal ($\chi_{yyy}$) skew scattering on a honeycomb lattice.
Figure 6A:
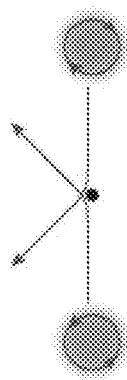
FIG. 6A illustrates longitudinal ($\chi_{yyy}$) skew scattering on a honeycomb (e.g., graphene) lattice.

FIGS. 5A-5D and 6A-6D illustrate the second-order response by skew scattering on a honeycomb lattice for the longitudinal ($\chi_{yxx}$) and transverse ($\chi_{yyy}$) cases, respectively. FIGS. 5A and 6A show the schematics of skew scattering. When a self-rotating wave packet (large circles) is scattered by an inversion-symmetric potential (small circle), its motion is deflected like the Magnus effect. Two wave packets moving in the opposite directions produces zero net current. However, if the two self-rotate in different directions, skew scattering produces net current in the perpendicular direction.

Figure 6B:
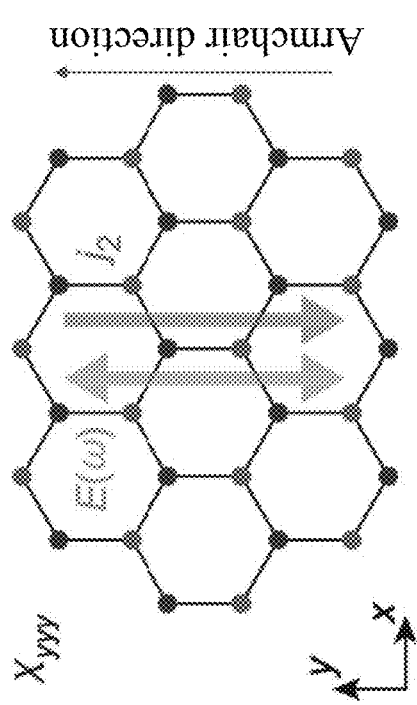
FIG. 6B illustrates the electric field and rectified current for longitudinal ($\chi_{yyy}$) skew scattering on a honeycomb lattice.

FIGS. 5B and 6B show the electric field and rectified current on a honeycomb lattice. There are two schemes for measuring a strong rectification effect: the AC oscillating field can be along either the zigzag direction (FIG. 5B) or armchair direction (FIG. 6B) and the DC rectification signal is collected along the armchair direction.

FIGS. 5C and 6C shows Fermi surface displacement at frequency ω (solid outline). The oscillating electric field E(w) forces the Fermi surface to swing back and forth from its equilibrium position (dashed outline). Owing to the Fermi surface anisotropy, each valley yields finite velocity V along the $k_x$ direction after time averaging. This velocity is canceled with the two valleys, and there is no DC current generated as a linear response.

FIGS. 5D and 6D show the stationary Fermi surface displacement. The electric field and skew scattering produce the stationary Fermi surface displacement (solid outline) from the equilibrium state (dashed outline) as a second-order response. Finite rectified current is observed when the contributions from the two valleys do not cancel.

Results

Second-Order Response

We study the DC current in a homogeneous material generated at second order by an external electric field E of frequency ω. The second-order response also involves a 2ω component, corresponding to the second-harmonic generation, which we do not focus on in this work. We write down the second-order DC response as $$j_a = \chi_{abc} E^*_b E_c, \quad (1)$$

where $\chi_{abc}$ is the rank-three tensor for the second-order conductivity, $E_a = E_a(\omega)$ is the (complex) amplitude of the external electric field of frequency ω, and the indices a, b, c label the coordinates. $\chi_{abc}$ satisfies $\chi_{abc} = \chi^*_{acb}$. Since the current $j_a$ is odd under inversion while the electric field $E_a$ is even, finite $\chi_{abc}$ is possible only in noncentrosymmetric media. The second-order response can be decomposed into two parts as $j_a = \chi_{abc}' E^*_b E_c + i\chi_{abc}'' E^*_b E_c$, with $\chi_{abc}' = \chi_{acb}'$ and $\omega_{abc}'' = -\chi_{acb}''$. The former describes the response to a linearly-polarized field and the latter to a circularly-polarized field. It is important to note that in an isotropic medium second-order response to a linearly-polarized field must vanish. In other words, a nonzero $\chi'_{abc}$ requires the presence of crystal anisotropy.

Nonlinear responses are studied extensively in the optical frequency regime. The classical approach to nonlinear optics considers electrons bound to a nucleus by an anharmonic potential, so that the restoring force to the displacement of electrons becomes nonlinear. In quantum-mechanical theory, the nonlinear optical response at frequencies larger than the band gap is usually dominated by electric dipole transitions between different bands. On the other hand, with energy harvesting and infrared detection in mind, here we consider intra-band nonlinear response at frequencies below the inter-band transition threshold.

Semiclassical Boltzmann Analysis

We analyze the second-order electrical transport using the semiclassical Boltzmann theory. For a homogeneous system, the Boltzmann equation is given by ($\hbar=1$):

$$\frac{\partial f}{\partial t} + \dot{k} \cdot \frac{\partial f}{\partial k} = -C[f], \tag{2}$$

where $f(k, \epsilon)$ is the distribution function at energy $\epsilon$ and $C[f]$ denotes the collision integral. The time derivative of the wavevector is equal to the force felt by an electron $\dot{k}=-eE$ under the external electric field E. The distribution function $f$ deviates from the equilibrium Fermi-Dirac distribution when electrons are accelerated by the external field. A nonequilibrium steady state is obtained by the balance of the acceleration and the relaxation due to scattering, described by the collision integral $C[f]$, whose explicit form is shown below in a general form. It includes the scattering rate $w_{k,k'}$, the probability of the transition per unit time from a Bloch state with a wavevector k to that with k'. We consider scattering by impurities. The impurity density should be sufficiently lower than the electron density for the semiclassical Boltzmann analysis to be valid; see below for further discussions.

To obtain a nonzero second-order conductivity $\chi_{abc}$, we should capture the effect of inversion breaking. For time-reversal-invariant systems, the energy dispersion $\epsilon_k$ and the band velocity $v_0(k)=\nabla_k\epsilon_k$ satisfy the conditions $\epsilon_k=\epsilon_{-k}$ and $v_0(k)=-v_0(-k)$, which hold with or without inversion symmetry; that is, the absence of inversion is encoded in the wavefunction but not in the energy dispersion.

One consequence of inversion asymmetry is manifested in a scattering process, as the transition rate depends not only on the dispersion but also on the Bloch wavefunction $\psi_k$. For and only for noncentrosymmetric crystals, the transition rate from k to k' and from -k to -k' can be different: $w_{k,k'}\neq w_{-k',-k}$. A scattering process with such asymmetry is referred to as skew scattering. Skew scattering is a source of the second-order DC response, i.e., rectification. The strength of skew scattering is characterized by $w_{k'k}^{(A)}=(w_{k',k}-w_{-k',k})/2$, whereas the symmetric component $w_{k'k}^{(S)}=(w_{k'k}+w_{-k',-k})/2$ does not rely on inversion breaking. The presence of time-reversal symmetry guarantees $w_{k'k}=w_{-k,-k'}$, which allows us to write $w_{k'k}^{(S,A)}=(w_{k'k}\pm w_{kk'})/2$.

The transition rate $w_{k'k}$ is usually calculated to the lowest order in scattering potential by Fermi's golden rule. For elastic impurity scattering, it is given by $w_{k'k}^{(S)}=2\pi\langle|V_{k'k}|^2\rangle\delta(\epsilon_{k'}-\epsilon_k)$, where $V_{k'k}$ is the matrix element of a single scatterer and $\langle\rangle$ denotes the impurity average. However, this formula is symmetric under the exchange $k\leftrightarrows k'$ and does not capture skew scattering. The latter arises at the next-leading order from the interference of a direct transition $k\leftrightarrows k'$ and an indirect process $k\rightarrow k'$ via an intermediate state q:

$$w_{k'k}^{(A)}=-(2\pi)^2\int_q Im\langle V_{k'q}V_{qk}V_{kk'}\rangle\delta(\epsilon_k-\epsilon_{k'})\delta(\epsilon_{k'}-\epsilon_q), \tag{3}$$

which satisfies $w_{k'k}^{(A)}=-w_{kk'}^{(A)}$. Here we use the notation $\int_q=\int d^dq/(2\pi)^d$ (d is the spatial dimension).

Skew scattering provides an extrinsic contribution to the anomalous Hall effect and the spin Hall effect. These are linear response phenomena in systems with broken time-reversal and spin-rotational symmetries, respectively. Skew scattering exists and contributes to the second-order response even in materials with both time-reversal and spin-rotational symmetry. With regard to its microscopic origin, skew scattering can be caused by nonmagnetic impurities when the single-impurity potential V(r) is inversion asymmetric, such as a dipole or octupole potential. Even for a symmetric single-impurity potential V(r)=V(-r), such as a delta function potential, skew scattering can also appear. In such cases, skew scattering is due to the chirality of the electron wavefunction in a noncentrosymmetric crystal. In the simplest case of a delta function impurity potential, we have $V_{k'k}\propto\langle u_{k'}|u_k\rangle$ where $|u_k\rangle$ is the Bloch wavefunction within a unit cell. Then the expression for $w^{(A)}$ given in Eq. (3) involves the wavefunction overlap at different k points on the Fermi surface, similar to the Berry phase formula, and also skew scattering is known to be related to Berry curvature in a certain limit.

While there is no net chirality in nonmagnetic systems, the Bloch wavefunction $|u_k\rangle$ of an electron at finite momentum can be complex and carry k-dependent orbital magnetization, spin polarization, or Berry curvature. In other words, mobile electrons in inversion-breaking nonmagnetic crystals can exhibit momentum-dependent chirality that is opposite at k and -k. Then, skew scattering occurs due to electron chirality in a similar way as the classical Magnus effect, where a spinning object is deflected when moving in a viscous medium. The spinning motion is associated with the self-rotation of a wave packet and the viscosity results from scattering with impurities; see FIGS. 5A and 6A.

To obtain the second-order conductivity, the distribution function $f(k)$ should be calculated to second order in the external electric field $E(\omega)$. Moreover, since skew scattering $w^{(A)}$ is parametrically smaller than $w^{(S)}$, we expand the distribution function up to first order in $w^{(A)}$. Solving the Boltzmann equation self-consistently at each order of E and $w^{(A)}$ yields the second-order DC current response $j=-e\int_k v_0(k)f(k)$ due to skew scattering in time-reversal-invariant systems. The second-order conductivity $\chi_{abc}$ can be formally expressed in terms of various scattering times $\tau_n$, $\tau'_n$:

$$\chi_{abc}=-e^3[\tau'_2\tau'_1(\omega)\tau_1(\omega)\int_k v_{0,a}\partial_{k_b}f_k w_{kk'}^{(A)}\partial_{k'_c}f_0(k')+\tau'_2\tau'_2\tau_1(\omega)\int_k v_{0,a}f_k w_{kk'}^{(A)}\partial_{k_b}\partial_{k'_c}f_0(k')]+(b\leftrightarrows c)^*, \tag{4}$$

where $\tau_n(\omega)$ is a shorthand for $\tau_n(\omega)=\tau_n/(1-i\omega\tau_n)$ and likewise for $\tau'_n(\omega)$. The scattering times $\tau_n$, $\tau'_n$ with n=1, 2 are associated with the dominant symmetric scattering $w^{(S)}$; see below for details. They determine the steady-state distribution function up to second order in the electric field, when skew scattering is neglected. A detailed discussion of a self-consistent solution of the Boltzmann equation and Joule heating appears below.

A rough order-of-magnitude estimate of x can be obtained from Eq. (4) by using two scattering times $\tau$ and $\tilde{\tau}$ for the symmetric and skew scattering, respectively. Then, the second-order DC current of a metal or degenerate semiconductor under a linearly-polarized electric field is given by $$j_2 \sim env_F \cdot \left(\frac{eE\Delta t}{p_F}\right)^2 \cdot \frac{\tau}{\tilde{\tau}} \tag{5}$$

with $\Delta t=\tau$ for $\omega\tau \ll 1$ and $\Delta t=1/\omega$ for $\omega\tau \gg 1$. Here $v_F$ is the Fermi velocity, $p_F=\hbar k_F$ is the Fermi momentum, and n is the electron density.

This estimate provides a heuristic understanding of the second-order response. In the low-frequency limit $\omega \to 0$, the ratio of the second-order current $j_2$ and the linear response current $j_1=\sigma_\omega E$ is a product of two dimensionless quantities $eE\tau/p_F$ and $\tau/\tilde{\tau}$. The first term is the change of electron's momentum under the external field during the mean free time, divided by the Fermi momentum. The second term $\tau/\tilde{\tau}$ characterizes the strength of skew scattering which is responsible for second-order electrical response, relative to the symmetric scattering.

The short-circuit current responsivity $\mathfrak{R}_I$ is a metric for a rectifier, defined as the ratio of the generated DC current to the power dissipation. With a sample dimension $L^2$, the current responsivity is given by $\mathfrak{R}_I \equiv j_2 L/(j_1 E L^2)$. Similarly, the voltage responsivity $\mathfrak{R}_V$ is defined for the generated DC voltage as $\mathfrak{R}_V \equiv (j_2 L/\sigma_0)/(j_1 E L^2)$. Both $\mathfrak{R}_I$ and $\mathfrak{R}_V$ are independent of the magnitude of the external electric field. Using the linear response conductivity $\sigma_\omega \sim env_F \cdot (e\lambda_F \tau/\hbar) \text{Re}[(1-i\omega\tau)^{-1}]$ obtained from the same Boltzmann equation gives the short-circuit current responsivity and voltage responsivity:

$$R_I = \frac{1}{L}\frac{\chi}{\sigma_\omega} = \frac{\eta_I}{L}\frac{\tau}{\tilde{\tau}}, \quad \eta_I \sim \frac{e\tau}{p_F}, \qquad (6)$$

$$R_V = \frac{1}{L}\frac{\chi}{\sigma_\omega \sigma_0} = \frac{\eta_V}{L}\frac{\tau}{\tilde{\tau}}, \quad \eta_V \sim \frac{1}{env_F},$$

Here we define the reduced current and voltage responsivities $\eta_I$ and $\eta_V$, respectively, which are independent of the sample size and the ratio $\tau/\tilde{\tau}$. The approximate relations for $\eta_I$ and $\eta_V$ hold in both low- and high-frequency limits. We also consider the ratio of the generated DC power and input power $\eta_P \equiv (j_2^2/\sigma_0)/(\sigma_\omega E^2)$, which characterizes the power conversion efficiency (assuming the load resistance and internal resistance are comparable). We find $$\eta_P = \frac{\chi^2 E^2}{\sigma_0 \sigma_\omega} \propto \left(\frac{eE\Delta t}{p_F}\right)^2 \cdot \left(\frac{\tau}{\tilde{\tau}}\right)^2. \qquad (7)$$

These figures of merit show that a material with low carrier density n or small Fermi momentum $p_F$ is desirable for efficient rectification. Moreover, a longer mean free time leads to a higher current responsivity. In this respect, high-mobility semiconductors and semimetals are promising as rectifiers for infrared detection. In the following, we analyze graphene systems and estimate their efficiency of rectification.

Graphene Multilayers and Transition Metal Dichalcogenides

Pristine graphene has high mobility and low carrier density, but it is centrosymmetric. Nevertheless, as a van der Waals material, we can assemble multilayer stacks to break inversion. Realizations of noncentrosymmetric structures include monolayer graphene on a hexagonal boron nitride (hBN) substrate, electrically-biased bilayer graphene, and multilayer graphene, such as ABA-stacked trilayer graphene. Anisotropy of energy dispersions, also used for second-order response, naturally arises from trigonal crystal structures.

Skew scattering arises from the chirality of quantum wavefunctions and contributes to the second-order conductivity in graphene heterostructures with gaps induced by inversion symmetry breaking. The k·p Hamiltonian considered here is $$H_s(k) = \begin{pmatrix} \Delta & svk_- - \lambda k_+^2 \\ svk_+ - \lambda k_-^2 & -\Delta \end{pmatrix}, \qquad (8)$$

where $s=\pm 1$ denotes two valleys at K and K', respectively, and we define $k_\pm = k_x \pm ik_y$. This Hamiltonian has a band gap of $2\Delta$ in the energy spectrum and describes two graphene systems: (1) monolayer graphene on hBN, where the spatially varying atomic registries break the carbon sublattice symmetry and opens up gaps at Dirac points, and (2) bilayer graphene with an out-of-plane electric field that breaks the layer symmetry and opens up gaps. The difference between the monolayer and bilayer cases lies in the relative strength of v and $\lambda$. For the monolayer (bilayer) case, $\lambda k_F^2 \ll vk_F$ ($vk_F \ll k_F^2$) is responsible for the trigonal warping of the linear (quadratic) energy dispersion.

The Bloch wavefunction of $H_S(k)$ has two components associated with sublattice (layer) degrees of freedom in monolayer (bilayer) graphene. When the band gap is present ($\Delta \neq 0$), the wavefunction in each valley is chiral and carries finite Berry curvature, leading to skew scattering from nonmagnetic impurities. The chirality and Berry curvature are opposite for valley K and K' due to time reversal symmetry. Because of the three-fold rotation symmetry of graphene, Berry curvature dipole vanishes, leaving skew scattering as the only mechanism for rectification.

We calculate the second-order conductivity from Eq. (4), and find nonvanishing elements $\chi_{xxy}=\chi_{xyx}=\chi_{yxx}=-\chi_{yyy}\equiv\chi$, consistent with the point group symmetry. The relation among the electric field, induced current, and underlying crystalline lattice is depicted in FIGS. 5B and 6B, along with the schematic pictures of the Fermi surface displacement in FIGS. 5C, 5D, 6C, and 6D. The function $\chi$ has the form $\chi=e^3 v_F(\tau^3/\tilde{\tau})\zeta(\epsilon_F, \omega)$, with the dimensionless function $\zeta$ given below. The ratio $\tau/\tilde{\tau}$ is proportional to the gap $\Delta$ and the Fermi surface trigonal warping. The gap $\Delta$ describes the effect of inversion breaking on the electronic structure, while the Fermi surface trigonal warping is responsible for Fermi surface asymmetry within a valley $E_s(k) \neq E_s(-k)$.

FIGS. 7A-7D show the second-order conductivity $\chi$ and the reduced voltage responsivity $\eta_V$ for both monolayer and bilayer gapped graphene as functions of frequency $v=\omega/(2\pi)$. FIGS. 7A and 7C show the second-order conductivity $\chi$ for monolayer graphene and bilayer graphene, respectively. FIGS. 7B and 7D show the reduced voltage responsivity $\eta_V$ for monolayer graphene and bilayer graphene, respectively. The carrier density n is changed from $0.5 \times 10^{12}$ cm$^{-2}$ to $5 \times 10^{12}$ cm$^{-2}$. We use the values $v=0.94 \times 10^6$ m/s, $\Delta=15$ meV, and $\tau=1.13$ ps for the monolayer case; $\Delta=50$ meV and $\tau=0.96$ ps for the bilayer case, from transport, infrared spectroscopy, and scanning tunneling microscopy/spectroscopy measurements. For the bilayer case $\lambda=(2m)^{-1}$ is determined by the effective mass $m \approx 0.033 m_e$ ($m_e$: electron mass) and $v \approx 1 \times 10^5$ m/s.

The frequency dependence of the second-order conductivity is qualitatively understood with Eq. (5). We can further simplify the relation in two dimensions for $n\lambda_F^2$=constant. The second-order conductivity then behaves as $\chi \sim e^3 v_F \tau^2/\hbar^2 \cdot (\tau/\tilde{\tau})$ for $\omega\tau \ll 1$ and $\chi \sim e^3 v_F/(\hbar\omega)^2 \cdot (\tau/\tilde{\tau})$ for $\omega\tau \gg 1$.

The responsivity is affected by the linear conductivity σ as well as the second-order conductivity χ. At high frequencies with the carrier density fixed, we observe a decrease of the rectified current while the energy dissipation by the linear response also decreases. Since both σ and χ decrease as $\omega^{-2}$, the responsivity saturates in the high frequency limit. With a sample size of 10 μm, carrier density $n=0.5 \times 10^{12}$ cm$^{-2}$, and ratio $\tau/\tilde{\tau}=0.01$, reasonable estimates of mean free time and impurity concentration give a saturated voltage responsivity $\mathfrak{R}_V \sim 30$ V/W for monolayer graphene and 40 V/W for bilayer graphene (see below for the frequency dependence). As expected from the qualitative estimate Eq. (6), high responsivity is realized with low carrier density. The semiclassical approach is valid when the mean free path is much longer than the Fermi wavelength.

Both monolayer and bilayer graphene show broadband response. The saturation of responsivities lasts up to the onset frequency of an inter-band transition (not included in our study). For example, at the lowest density of $n=0.5 \times 10^{12}$ cm$^{-2}$ shown in FIGS. 7A-7D, the Fermi energy for the monolayer case is $\epsilon_F \sim 80$ meV, so that due to the Pauli blocking the inter-band transition does not occur at frequencies below $2\epsilon_F \sim 40$ THz. The inter-band threshold frequency also increases with the band gap, which is tunable in bilayer graphene by the displacement field.

Finite temperature affects the intra-band second-order response and responsivity through thermal smearing of the distribution function and the change of scattering times. Here, thermal smearing does not change the result much as the Fermi energy is much higher than room temperature. Since it utilizes material's intrinsic nonlinearity, rectification from the intra-band process considered here does not suffer from the noise associated with thermally excited electron-hole pairs in photodiodes.

Our analysis also applies to 2H-TMD monolayers, where transition metal and chalcogen atoms form trigonal crystal structures. Similar to gapped graphene, their band structures can also be described as massive Dirac fermions with trigonal warping, but with much larger band gaps. Hence, they should exhibit large intra-band second-order response as well. Topological insulator surface states also show this effect (see below). In addition to 2D systems, three-dimensional bulk materials without inversion are also worth considering. As discussed, they should have large responsivities in low carrier densities. From this respect, inversion-breaking Weyl semimetals could also be used in place of graphene for current rectification.

Discussion

So far, we have considered the skew scattering contribution to the second-order DC response by neglecting the effects from the Berry curvature Ω directly. It contributes to the distribution function through the collision integral and the electron's velocity as anomalous and side-jump velocities. Hence the second-order conductivity is also modified. The Berry curvature is odd (even) under time reversal (inversion), and thus is allowed to exist in time-reversal-invariant noncentrosymmetric materials. The effect of Berry curvature to linear transport properties has been well studied in the context of the anomalous Hall effect. Finite Berry curvature enforces a coordinate shift $\delta r_{kk'}$ after scattering, giving a displacement of the center of an electron wave packet. It is accompanied by a potential energy shift $\delta\epsilon_{k'k}$ in the presence of the external field, which results in the collision integral $$C[f] = \int_{k'} [w_{k'k}f(k,\epsilon_k) - w_{kk'}f(k',\epsilon_k + \delta\epsilon_{k'k})]. \quad (9)$$

One may decompose the distribution function in nonequilibrium as $f = f_0 + f^{scatt} + f^{adist}$, where $f_0$ is the equilibrium distribution function, $f^{scatt}$ describes the effect of scattering to the distribution (with $\delta\epsilon_{k'k}=0$), and $f^{adist}$ is the anomalous distribution due to finite $\delta\epsilon_{k'k}$. Because of the different origins, these distributions have distinct dependence on the scattering time τ. For low frequencies with $\omega\tau \ll 1$, the τ dependence of each term can be estimated by a simple power counting. Noting that the scattering rate w amounts to $\tau^{-1}$, we can expand the distribution function in powers of the electric field E, with coefficients depending on τ:

$$f^{scatt} = \sum_{n \geq 1} f_n^{scatt}, f_n^{scatt} \propto \tau^n E^n,$$

$$f^{adist} = \sum_{n \geq 1} f_n^{adist}, f_n^{adist} \propto \tau^{n-1} E^n, \quad (10)$$

in the weak impurity limit.

The electric current density is obtained by $j = -e\int_k v(k)f(k)$, where v(k) is the electron's velocity, $$v = \frac{\partial \epsilon_k}{\partial k} - \dot{k} \times \Omega + \int_{k'} w_{k'k} \delta r_{k'k} \equiv v_0 + v_{av} + v_{sj}. \quad (11)$$

Besides the velocity given by the band dispersion $v_0$, v contains two additional terms: The anomalous velocity $v_{av}$ is associated with the Berry curvature and the last term $v_{sj}$ describes the side-jump contribution, which arises from a combined effect of scattering and Berry curvature. Now, we can see several contributions to the second-order conductivity χ from combinations in the product of the out-of-equilibrium distribution function ($f^{scatt} + f^{adist}$) and the electron velocity ($v_0 + v_{av} + v_{sj}$).

The dominant contribution in the weak impurity limit ($\tau \to \infty$) emerges from the skew scattering with $v_0 f_2^{scatt}$, resulting in $\chi \propto \tau^2$. The Berry curvature dipole contribution corresponds to $v_{va}f_1^{scatt}$, which amounts to $\chi \propto \tau$. It shows the frequency dependence as $\chi' \propto e^3\tau D$, $\psi'' \neq 0$ for low frequencies ($\omega\tau \ll 1$) and $\chi' \propto e^3 D/(\omega^2\tau)$, $\chi'' \propto e^3 D/\omega$ for high frequencies ($\omega\tau \gg 1$), where D is the Berry curvature dipole. The Berry curvature dipole is a quantity with dimensions of length in a two-dimensional system; it is dimensionless in a three-dimensional system. The Berry curvature dipole and skew scattering have the same frequency dependence although they are distinct in the x dependence.

Inversion breaking results in finite skew scattering $w^{(4)}$. Along with the accompanying anisotropic Fermi surface, the second-order electronic response induced by skew scattering should persist in any noncentrosymmetric material. This is in marked contrast to the Berry curvature dipole mechanism, which imposes more symmetry constraints in addition to inversion breaking. Some symmetry classes without inversion, e.g., those containing three-fold rotation axis, do not show nonlinear response from a Berry curvature dipole.

In summary, the analysis above is a systematic study of second-order electrical response due to an intra-band process. Skew scattering makes the dominant contribution in the weak impurity limit. Skew scattering is responsible for current rectification and opens a new way to low-power energy harvesters and terahertz detection.

Semiclassical Boltzmann Theory

We describe in detail the analysis of the semiclassical Boltzmann transport theory for the calculation of second-order response in noncentrosymmetric materials. The following analysis is not meant to be limiting and to some extent is parallel with that for the anomalous Hall effect. However, a fundamental difference is found in symmetry;

for a second-order response, inversion is broken whereas time-reversal symmetry is broken for the anomalous Hall effect.

The total Hamiltonian is given by $$H = H_0 + V + U,$$

where $H_0$ is the Hamiltonian for electrons in the clean limit with the eigenvalue $\epsilon_k$, V describes electron scattering, and U includes the external electric field, which drives the system into nonequilibrium. In a semiclassical description, U results in the force acting on an electron's wave packet: $\nabla_r U = -F$. In the following, we consider an external electric field of frequency $\omega$, namely, $F = -eE(\omega)$.

A formally rigorous analysis involves a quantum-mechanical calculation of density matrices, which usually requires considerable effort. The semiclassical analysis is simpler and offers intuitive understanding; the downside is that it may have limitations owing to the uncertainty principle. The semiclassical description relies on wave packets of Bloch states. A wave packet is localized both in the real space and the momentum space so that the mean position r and momentum k can be designated. However, the uncertainty principle imposes the limitation $\Delta r \Delta k \geq 1$. We desire position and momentum resolutions set by the mean free path $\ell$ and the Fermi wavevector $k_F$; i.e., $k_F \ell \gg 1$ is assumed for the semiclassical analysis. In the following, we deal with electron scattering by impurities. Since $\ell$ and $k_F$ depend on the impurity and electron densities, respectively, the condition is satisfied when the impurity density is sufficiently lower than the electron density.

We deal with spatially homogeneous systems and hence the electron distribution function $f(k, \epsilon)$ does not depend on the spatial position, but on the wavevector k and the energy $\epsilon$. We assume that the frequency of the external field $\omega$ is lower than the inter-band spacing, so that inter-band transitions are suppressed and negligible. We calculate the distribution function in the presence of the external field by the semiclassical Boltzmann equation ($\hbar = 1$)

$$\frac{\partial f}{\partial t} + \dot{k} \cdot \frac{\partial f}{\partial k} = -C[f]. \quad (12)$$

The time derivative of the momentum is equal to the force felt by an electron wave packet: $\dot{k} = F$. The collision integral $C[f]$ is given by $$C[f] = \int_{k'} [w_{k'k} f(k,\epsilon) - w_{kk'} f(k', \epsilon + \delta\epsilon_{k'k})],$$

where $w_{k'k}$ is the scattering rate from a state with momentum k to one with k'. In the following, we consider elastic scattering. Then, the scattering rate is defined by $$w_{k'k} = 2\pi |T_{k'k}|^2 \delta(\epsilon_{k'} - \epsilon_k),$$

with the scattering T matrix $T_{k'k}$. It is given by $T_{k'k} = \langle k' | V | \psi_k \rangle$, where $|k\rangle$ is the eigenstate of $H_0$, the Hamiltonian in the clean limit, and $|\psi_k\rangle$ is the eigenstate of $H_0 + V$, including the scattering. $|\psi_k\rangle$ can be obtained as the solution to the Lippman-Schwinger equation $|\psi_k\rangle = |k\rangle + (\epsilon_k - H_0 + i\delta)^{-1} V |\psi_k\rangle$.

The energy shift $\delta Å_{k'k}$ occurs after a scattering owing to the Berry curvature $\Omega$. The Berry curvature is defined from the Berry connection A as $$A_a = i \langle u_k | \partial_{k_a} | u_k \rangle, \Omega_a = \epsilon_{abc} \partial_{k_b} A_c$$

where $|\psi_k\rangle$ is the lattice periodic part of the Bloch function at k and $\epsilon_{abc}$ is the Levi-Civita symbol. The Berry curvature transforms under inversion $\mathcal{P}$ and time reversal $\mathcal{T}$ as $$\mathcal{P}: \Omega_a(k) \to \Omega_a(-k), \mathcal{T}: \Omega_a(k) \to -\psi_a(-k).$$

It is deduced that the Berry curvature vanishes everywhere in the Brillouin zone when $\mathcal{PT}$ symmetry exists. Finite Berry curvature causes the coordinate shift at a scattering process, denoted by $\delta r_{k'k}$, which describes the displacement of the center of a wave packet by a scattering $k \to k'$. The energy shift $\delta\epsilon_{k'k}$ is given by using the coordinate shift $\delta r_{k'k}$ as $$\delta\epsilon_{k'k} = -F \cdot \delta r_{k'k}.$$

For a weak scattering with a small momentum change, the coordinate shift can be approximated as $\delta r_{k'k} \approx (k'-k) \times \Omega(k)$. The coordinate shift is independent of the scattering time $\tau$ even though it is related to scattering; it describes the displacement after a single impurity scattering.

We decompose the distribution function $f$ as $$f = f_0 + f^{scatt} + f^{adist}.$$

The first term $f_0$ is the distribution function in equilibrium, i.e., the Fermi-Dirac distribution. The second term $f^{scatt}$ describes the scattering contribution without the Berry curvature and the last term $f^{adist}$ is the anomalous distribution due to the Berry curvature and the energy shift $\delta\epsilon_{k'k}$.

Scattering Rate in Noncentrosymmetric Media

In noncentrosymmetric media, the probabilities of a scattering process $k \to k'$ and the inverted process $-k \to -k'$ can be different. For time-reversal systems, this imbalance is captured by decomposing the scattering rate into two parts:

$$w_{kk'} = w_{kk'}^{(S)} + w_{kk'}^{(A)},$$

where the symmetric and antisymmetric parts $w^{(S)}$ and $w^{(A)}$, respectively, are defined by $$w_{kk'}^{(S)} = \tfrac{1}{2}(w_{kk'} + w_{k'k}), w_{kk'}^{(A)} = \tfrac{1}{2}(w_{kk'} - w_{k'k}).$$

When time reversal is preserved, the scattering rate satisfies the reversibility $w_{kk'} = w_{-k',-k}$, which leads to the relations $$w_{k'k}^{(S)} = w_{-k,-k'}^{(S)} = w_{kk'}^{(S)},$$

$$w_{k'k}^{(A)} = w_{-k,-k'}^{(A)} = -w_{kk'}^{(A)}.$$

Those equalities do not hold in general when time reversal is broken since states at k and $-k$ usually have different energies. The optical theorem for elastic scattering guarantees the relation $$\int_{k'} w_{kk'}^{(A)} = 0. \quad (13)$$

When the elastic scattering is due to impurities, $w^{(S)}$ and $w^{(A)}$ are obtained to the lowest order in the impurity scattering potential by $$w_{k'k}^{(S)} = 2\pi \langle |V_{k'k}|^2 \rangle \delta(\epsilon_{k'} - \epsilon_k),$$

$$w_{k'k}^{(A)} = -(2\pi)^2 \int_q Im \langle V_{k'q} V_{qk} V_{kk'} \rangle \delta(\epsilon_k - \epsilon_{k'}) \delta(\epsilon_k - \epsilon_q), \quad (14,15)$$

where $\langle \rangle$ denotes the average over the impurity distribution and $V_{k'k}$ is the matrix element for the single impurity scattering. The symmetric part of the scattering rate is obtained at the lowest order of the Born approximation, whereas the antisymmetric part is found at the next leading order. The detailed balance is broken when the antisymmetric part is finite.

V. I. Belinicher et al., "The photogalvanic effect in media lacking a center of symmetry," *Sov. Phys. Usp.* 23, 199-223 (1980), reviews the photogalvanic effect in noncentrosymmetric materials, considering the asymmetry of scattering.

The photovoltaic effect is studied with the Boltzmann equation and the antisymmetric component of the) scattering rate $w_{k'k}^{(A)}$, similarly to our analysis. A difference can be found in the origin of finite $w_{k'k}$. The asymmetry may be imposed on scattering potentials for impurity scattering, ionization, photoexcitation, and recombination. The asymmetry of the scattering rate can be finite due to an asymmetric scattering potential and also a wavefunction of a noncentrosymmetric medium. For the latter case, a scattering potential does not need to be inversion asymmetric to have finite $w_{k'k}^{(A)}$, but even an isotropic scattering potential can generate $w_{k'k}^{(A)}$ through a wavefunction.

Formal Solutions

The semiclassical Boltzmann equation (12) should be solved self-consistently to obtain the distribution function $f(k)$. Here, we expand the distribution function $f = f_0 + f^{scatt} + f^{adist}$ with respect to the electric field $E(\omega)$ and the asymmetric part of the scattering rate $w^{(A)}$:

$$f^{scatt}(k) = \sum_{n \geq 1} f_n^{scatt}(k), \quad f_n^{scatt}(k) = \sum_{m \geq 0} f_n^{(m)}(k),$$

$$f^{adist}(k) = \sum_{n \geq 1} f_n^{adist}(k), \quad f_n^{adist}(k) = \sum_{m \geq 0} g_n^{(m)}(k).$$

The subscript n and the superscript m correspond to the orders of the electric field E and the antisymmetric scattering rate $w^{(A)}$, respectively. As we have seen in Eqs. (14) and (15), $w^{(A)}$ is smaller than $w^{(S)}$, so that we treat the former as a perturbation. Then, the Boltzmann equation is decomposed for each $f_n^{(m)}$ or $g_n^{(m)}$ to become $$\frac{\partial f_1^{(0)}}{\partial t} - eE \cdot \frac{\partial f_0}{\partial k} = -\int_{k'} w_{kk'}^{(S)} [f_1^{(0)}(k) - f_1^{(0)}(k')],$$

$$\frac{\partial f_1^{(1)}}{\partial t} = -\int_{k'} w_{kk'}^{(S)} [f_1^{(1)}(k) - f_1^{(1)}(k')] + \int_{k'} w_{kk'}^{(A)} f_1^{(0)}(k'),$$

$$\frac{\partial f_2^{(0)}}{\partial t} - eE \cdot \frac{\partial f_1^{(0)}}{\partial k} = -\int_{k'} w_{kk'}^{(S)} [f_2^{(0)}(k) - f_2^{(0)}(k')],$$

$$\frac{\partial f_2^{(1)}}{\partial t} - eE \cdot \frac{\partial f_1^{(1)}}{\partial k} = -\int_{k'} w_{kk'}^{(S)} [f_2^{(1)}(k) - f_2^{(1)}(k')] + \int_{k'} w_{kk'}^{(A)} f_2^{(0)}(k'),$$

$$\frac{\partial g_1^{(0)}}{\partial t} = -\int_{k'} w_{kk'}^{(S)} [g_1^{(0)}(k) - g_1^{(0)}(k')] + \int_{k'} w_{kk'}^{(S)} f_0'(k')(eE \cdot \delta r_{k'k}),$$

$$\frac{\partial g_1^{(1)}}{\partial t} =$$

$$-\int_{k'} w_{kk'}^{(S)} [g_1^{(1)}(k) - g_1^{(1)}(k')] + \int_{k'} w_{kk'}^{(A)} g_1^{(0)}(k') + \int_{k'} w_{kk'}^{(A)} f_0'(k')(eE \cdot \delta r_{k'k}),$$

$$\frac{\partial g_2^{(0)}}{\partial t} - eE \cdot \frac{\partial g_1^{(0)}}{\partial k} = -\int_{k'} w_{kk'}^{(S)} [g_2^{(0)}(k) - g_2^{(0)}(k')] +$$

$$\int_{k'} w_{kk'}^{(S)} [f_1'^{(0)}(k') + g_1'^{(0)}(k')](eE \cdot \delta r_{k'k}) + \frac{1}{2} \int_{k'} w_{kk'}^{(S)} f_0''(k')(eE \cdot \delta r_{k'k})^2,$$

$$\frac{\partial g_2^{(1)}}{\partial t} - eE \cdot \frac{\partial g_1^{(1)}}{\partial k} = -\int_{k'} w_{kk'}^{(S)} [g_2^{(1)}(k) - g_2^{(1)}(k')] +$$

$$\int_{k'} w_{kk'}^{(S)} [f_1'^{(1)}(k') + g_1'^{(1)}(k')](eE \cdot \delta r_{k'k}) + \int_{k'} w_{kk'}^{(A)} g_2^{(0)}(k') +$$

$$\int_{k'} w_{kk'}^{(A)} [f_1'^{(0)}(k') + g_1'^{(0)}(k')](eE \cdot \delta r_{k'k}) + \frac{1}{2} \int_{k'} w_{kk'}^{(A)} f_0''(k')(eE \cdot \delta r_{k'k})^2.$$

A prime symbol ' added to the distribution functions stands for the derivative with respect to the energy: $f'(k, \epsilon) = \partial_\epsilon f(k, \epsilon)$.

Each equation should be solved self-consistently; however, this is usually not easy. Here, we solve a part of the collision integral involving $w^{(S)}$ self-consistently, while the other part with $w^{(A)}$ is treated as a perturbation. The collision integrals with $w^{(S)}$ define the scattering times $\tau_n^{(m)}$ and $\tau'_n^{(m)}$ as follows:

$$\int_{k'} w_{kk'}^{(S)} [f_n^{(m)}(k) - f_n^{(m)}(k')] = \frac{1}{\tau_n^{(m)}} f_n^{(m)}(k), \quad (16)$$

$$\int_{k'} w_{kk'}^{(S)} [g_n^{(m)}(k) - g_n^{(m)}(k')] = \frac{1}{\tau'_n^{(m)}} g_n^{(m)}(k).$$

If $\tau_n^{(m)}$ and $\tau'_n^{(m)}$ do not satisfy the self-consistency, one may regard the equations above as the definitions for the relaxation time approximation. The notation of the scattering times $\tau_n$ and $\tau'_n$ used in the main text; they correspond to $\tau_n \equiv \tau_n^{(0)}$ and $\tau'_n \equiv \tau_n^{(1)}$.

We assume $\tau$ and $\tau'$ are independent of momentum k in solving the equations. Then, we obtain the formal solutions for the distribution functions $f_n^{(m)}$ and $g_n^{(m)}$. The second-order response contains different frequencies, 0 and $\pm 2\omega$. Since now we focus on rectification, i.e., zero-frequency response, we write down only the second-order solutions with $\omega = 0$. Now, we list below the formal solutions up to the second order in the electric field ($n \leq 2$) and to the first order in $w^{(A)}$ ($m \leq 1$):

$$f_1^{(0)}(k, \omega) = \tau_{1\omega}^{(0)} eE_a \partial_{k_a} f_0(k), \quad (17)$$

$$f_1^{(1)}(k, \omega) = \tau_{1\omega}^{(1)} \int_{k'} w_{kk'}^{(A)} \tau_{1\omega}^{(0)} eE_a \partial_{k'_a} f_0(k'),$$

$$f_2^{(0)}(k, 0) = \tau_2^{(0)} eE_a^* \partial_{k_a} f_1^{(1)}(k, \omega) + c.c. = \tau_2^{(0)} eE_a^* \partial_{k_a} \tau_{1\omega}^{(0)} eE_b \partial_{k_b} f_0(k) + c.c.,$$

$$f_2^{(1)}(k, 0) = \tau_2^{(1)} eE_a^* \partial_{k_a} f_1^{(1)}(k, \omega) + c.c. + \int_{k'} w_{kk'}^{(A)} f_2^{(0)}(k', 0) =$$

$$\tau_2^{(1)} eE_a^* \partial_{k_a} \tau_{1\omega}^{(1)} \int_{k'} w_{kk'}^{(A)} \tau_{1\omega}^{(0)} eE_b \partial_{k'_b} f_0(k') +$$

$$\tau_2^{(1)} \int_{k'} w_{kk'}^{(A)} \tau_2^{(0)} eE_a^* \partial_{k'_a} \tau_{1\omega}^{(0)} eE_b \partial_{k'_b} f_0(k') + c.c.,$$

$$g_1^{(0)}(k, \omega) = \tau_{1\omega}'^{(0)} \int_{k'} w_{kk'}^{(S)} f_0'(k') eE_a \delta r_{a;k'k}, \quad (18)$$

$$g_1^{(1)}(k, \omega) =$$

$$\tau_{1\omega}'^{(1)} \left[ \int_{k'} w_{kk'}^{(A)} \tau_{1\omega}'^{(0)} \int_{k''} w_{k'k''}^{(S)} f_0'(k'') eE_a \delta r_{a;k''k'} + \int_{k'} w_{kk'}^{(A)} f_0'(k') eE_a \delta r_{a;k'k} \right],$$

$$g_2^{(0)}(k, 0) = \tau_2'^{(0)} \left[ eE_a^* \partial_{k_a} g_1^{(0)}(k, \omega) + \int_{k'} w_{kk'}^{(S)} [f_1'^{(0)}(k', \omega) + g_1'^{(0)}(k', \omega)] \right.$$

$$\left. eE_a^* \delta r_{a;k'k} + \frac{1}{2} \int_{k'} w_{kk'}^{(S)} f_0''(k') eE_a^* \delta r_{a;k'k} eE_b \delta r_{b;k'k} \right] + c.c. = \tau_2'^{(0)} \left[ \right.$$

$$eE_a^* \partial_{k_a} \tau_{1\omega}'^{(0)} \int_{k'} w_{kk'}^{(S)} f_0'(k') eE_{b;k'k} + \int_{k'} w_{kk'}^{(S)} eE_a^* \delta r_{a;k'k} \partial_{\epsilon_{k'}} \tau_{1\omega}^{(0)} eE_b \partial_{k'_b} f_0(k') +$$

$$\int_{k'} w_{kk'}^{(S)} eE_a^* \delta r_{a;k'k} \partial_{\epsilon_{k'}} \tau_{1\omega}'^{(0)} \int_{k''} w_{k'k''}^{(S)} f_0'(k'') eE_b \delta r_{b;k''k'} +$$

$$\left. \frac{1}{2} \int_{k'} w_{kk'}^{(S)} f_0''(k') eE_a^* \delta r_{a;k'k} eE_b \delta r_{b;k'k} \right] + c.c.,$$

$$g_2^{(1)}(k, 0) =$$

$$\tau_2'^{(1)} \left[ eE_a^* \partial_{k_a} g_1^{(1)}(k, \omega) + \int_{k'} w_{kk'}^{(S)} [f_1'^{(1)}(k', \omega) + g_1'^{(1)}(k', \omega)] eE_a^* \delta r_{a;k'k} + \right.$$

$$\left. \int_{k'} w_{kk'}^{(A)} g_2^{(0)}(k', 0) + \int_{k'} w_{kk'}^{(A)} [f_1'^{(0)}(k', \omega) + g_1'^{(0)}(k', \omega)] eE_a^* \delta r_{a;k'k} + \right.$$

-continued $$\frac{1}{2}\int_{k'} w_{kk'}^{(A)} f_0''(k') eE_a^* \delta r_{a;k'k} eE_b \delta r_{b;k'k} \right] + c.c. =$$

$$\tau_2'^{(1)}\left\{ eE_a^* \partial_{k_a} \tau_{1\omega}'^{(1)}\left[\int_{k'} w_{kk'}^{(A)} \tau_{1\omega}'^{(0)} \int_{k''} w_{k'k''}^{(S)} f_0'(k'') eE_b \delta r_{b;k''k'} + \right. \right.$$

$$\int_{k'} w_{kk'}^{(A)} f_0'(k') eE_b \delta r_{b;k'k} \right] + \int_{k'} w_{kk'}^{(S)} eE_a^* \delta r_{a;k'k}$$

$$\partial_{\epsilon_{k'}}\left[\tau_{1\omega}^{(1)}\int_{k''} w_{k'k''}^{(A)} \tau_{1\omega}^{(0)} eE_b \partial_{k_b''} f_0(k'') + \tau_{1\omega}'^{(1)} \int_{k''} w_{k'k''}^{(A)} \tau_{1\omega}'^{(0)} \int_{k'''} w_{k''k'''}^{(S)} f_0'(k''') \right.$$

$$eE_b \delta r_{b;k'''k''} + \tau_{1\omega}'^{(1)} \int_{k''} w_{k'k''}^{(A)} f_0'(k'') eE_b \delta r_{b;k''k'} \right] +$$

$$\int_{k'} w_{kk'}^{(A)} \tau_2'^{(0)}\left[ eE_a^* \partial_{k_a'} \tau_{1\omega}'^{(0)} \int_{k''} w_{k'k''}^{(S)} f_0'(k'') eE_b \delta r_{b;k''k'} + \int_{k''} w_{k'k''}^{(S)} eE_a^* \delta \right.$$

$$r_{a;k''k'} \partial_{\epsilon_{k''}} \tau_{1\omega}^{(0)} eE_b \partial_{k_b''} f_0(k'') + \int_{k''} w_{k'k''}^{(S)} eE_a^* \delta r_{a;k''k'} \partial_{\epsilon_{k''}} \tau_{1\omega}'^{(0)} \int_{k'''} w_{k''k'''}^{(S)}$$

$$f_0'(k''') eE_b \delta r_{b;k'''k''} + \frac{1}{2}\int_{k''} w_{k'k''}^{(S)} f_0''(k'') eE_a^* \delta r_{a;k''k'} eE_b \delta r_{b;k''k'} \right] +$$

$$\int_{k'} w_{kk'}^{(A)} eE_a^* \delta r_{a;k'k}\left[\tau_{1\omega}^{(0)} eE_b \partial_{k_a} f_0'(k) + \partial_{\epsilon_{k'}} \tau_{1\omega}'^{(0)} \int_{k''} w_{k'k''}^{(S)} f_0'(k'') eE_b \delta r_{b;k''k'} \right] +$$

$$\frac{1}{2}\int_{k'} w_{kk'}^{(A)} f_0''(k') eE_a^* \delta r_{b;k'k} eE_b \delta r_{b;k'k} \right\} + c.c.$$

$\tau_{n\omega}^{(m)}$ and $\tau'_{m\omega}^{(m)}$ are the shorthand notations for $$\tau_{n\omega}^{(m)} = \frac{\tau_n^{(m)}}{1 - i\omega\tau_n^{(m)}}, \quad \tau_{n\omega}'^{(m)} = \frac{\tau_n'^{(m)}}{1 - i\omega\tau_n'^{(m)}}.$$

Those formal solutions find the scattering time dependence of the distribution functions for low frequencies ($\omega\tau \ll 1$):

$$f_n^{scatt} \propto \tau^n E^n,$$

$$f_n^{adist} \propto (\tau^0 E^n, \tau^1 E^n, \ldots, \tau^{n-1} E^n).$$

Higher-order corrections for the anomalous distribution ($n \geq 2$) have a nested structure of $f_{n-1}^{scatt}$ and $f_{n-1}^{adist}$. In the weak disorder limit of $\tau \to \infty$, we obtain $$f_n^{adist} \propto \tau^{n-1} E^n.$$

We can define another scattering time $\tilde{\tau}$ from the antisymmetric part $w^{(A)}$. It is roughly speaking given by $$\int_{k'} w_{kk'}^{(A)} f(k') \sim \frac{1}{\tilde{\tau}} f(k). \tag{19}$$

The definition of $\tilde{\tau}$ is accompanied with the distribution function because the optical theorem for elastic scattering concludes Eq. (13).

Current Response

From the distribution function, the electric current response is obtained by $$j = -e\int_k v(k) f(k).$$

$v(k)$ is the electron's group velocity, given by $$v = \frac{\partial \epsilon_k}{\partial k} - \dot{k} \times \Omega + \int_{k'} w_{k'k} \delta r_{k'k}$$

$$\equiv v_0 + v_{av} + v_{sj}.$$

The group velocity from the energy band dispersion $v_0$ is independent of the Berry curvature, while the anomalous velocity $v_{av} = -\dot{k} \times \Omega = eE \times \Omega$ and the side-jump velocity $v_{sj} = \int_{k'} w_{k'k} \delta r_{k'k}$ are induced by the Berry curvature. In terms of the electric field E, $v_{av}$ is linear in E whereas $v_0$ and $v_{sj}$ do not depend on E. Lastly, only the side-jump velocity depends on the scattering time: $v_{sj} \propto \tau^{-1}$. Since there is no current in equilibrium, the electric current is described by $$j = -e\int_k (v_0 + v_{av} + v_{sj})(f^{scatt} + f^{adist}), \tag{20}$$

which allows us to decompose the current into contributions of different origins. The contribution from the anomalous distribution $f^{adist}$ could be recognized as a part of the side-jump effect since it is originated both from the Berry curvature and scattering.

Before calculating the second-order conductivity, consider the problem of energy dissipation or Joule heating because of $j \cdot E \neq 0$. Previous works indicates that a stationary state solution cannot be obtained for a closed system with energy conservation. To circumvent this issue, we neglect parts of the distribution function which are isotropically coupled to the electric field. To be more explicit, the distribution function at the second order in the electric field involves a term proportional to $|E|^2 f''_0$. Technically, such an excess term arises when we substitute a distribution function $f_n$ ($n \geq 1$) into the collision integral $C[f]$, which involves only elastic scattering. Since this term is isotropic, it cannot be relaxed by elastic scattering, which conserves energy, so that a stationary state solution does not exist. Inelastic scattering resolves the problem as it does not conserve energy and excess energy is dissipated as heat. An inelastic scattering time is typically much longer than an elastic scattering time. In calculating the second-order conductivity, we simply subtract and neglect such isotropic terms although they potentially change the temperature for a closed system. The isotropic terms do not contribute to current from the band velocity since $\int_k v_0 f'''_0 = \int_k \nabla_k f'_0 = 0$.

We can see the six possible combinations in Eq. (20). For the second-order current response, the scattering time dependence of each contribution for low frequencies $\omega\tau \ll 1$ is $$v_0 f_2^{scatt} \propto \tau^2, v_{av} f_1^{scatt} \propto \tau^1, v_{sj} f_2^{scatt} \propto \tau^1,$$

$$v_0 f_2^{adist} \propto (\tau^1, \tau^0), v_{av} f_1^{adist} \propto \tau^0, v_{sj} f_2^{adist} \propto (\tau^0, \tau^{-1}).$$

In the weak disorder limit of $\tau \to \infty$, the first term, the skew scattering contribution, $v_0 f^{scatt}$ predominates, which we focus on here. This is equivalent to neglecting effects related to Berry curvature. The second-order current response arising from this term is $$j_2 = -e\int_k v_0(k) f_2^{scatt}(k) = -e\int_k v_0(k) = -e\int_k v_0(k)[f_2^{(0)}(k) + f_2^{(1)}(k)].$$

We define the second-order conductivity by the relation $$j_{2,a} = \chi_{abc} E_b^* E_c,$$

and we obtain from Eqs. (17) and (18)

$$\chi_{abc} = \chi_{abc}^{(0)} + \chi_{abc}^{(1)},$$

$$\chi_{abc}^{(0)} = -e^3 \tau_2^{(0)} \tau_{1\omega}^{(0)} \int_k v_{0,a} \partial_{k_b} \partial_{k_c} f_0(k) + (b \leftrightarrows c)^*,$$

$$\chi_{abc}^{(1)} = -e^3 [\tau_2^{(1)} \tau_{1\omega}^{(1)} \tau_{1\omega}^{(0)} \int_k v_{0,a} \partial_{k_b} \int_{k'} w_{s,kk'}^{(A)} \partial_{k_c'} f_0 (k') + \tau_2^{(1)} \tau_2^{(0)} \tau_{1\omega}^{(0)} \int_k v_{0,a} \int_{k'} w_{s,kk'}^{(A)} \partial_{k_b'} \partial_{k_c'} f_0(k')] + (b \leftrightarrows c)^*. \tag{21,22}$$

$\chi_{abc}^{(0)}$ vanishes identically in time-reversal-invariant systems because of $\epsilon_k = \epsilon_{-k}$; it follows from $v_0(k) = -v_0(-k)$, and we see that the integrand is odd in k for $\chi_{abc}^{(0)}$. Therefore, the second-order contribution from the skew-scattering contribution arises from $\chi_{abc}^{(1)}$, i.e., $\chi_{abc}=\chi_{abc}^{(1)}$.

To calculate the second-order response, it is useful to express Eqs. (21) and (22) in the following forms:

$$\chi_{abc}^{(0)} = -e^3\tau_2^{(0)}\tau_{1\omega}^{(0)}\int_k [-f_0'(k)]v_{0,a}(\partial_{k_b}\partial_{k_c}\epsilon_k) + (b\leftrightarrow c)^*$$

$$= -2e^3\text{Re}[\tau_2^{(0)}\tau_{1\omega}^{(0)}]\int_k [-f_0'(k)]v_{0,a}(\partial_{k_b}\partial_{k_c}\epsilon_k),$$

$$\chi_{abc}^{(1)} = -e^3\left[\tau_2^{(1)}\tau_{1\omega}^{(1)}\tau_{1\omega}^{(0)}\int_k [-f_0'(k)](\partial_{k_a}\partial_{k_b}\epsilon_k)\int_{k'}w_{kk'}^{(A)}v_{0,c} - \right.$$

$$\tau_2^{(1)}\tau_2^{(0)}\tau_{1\omega}^{(0)}\int_k [-f_0'(k)]v_{0,a}\int_{k'}w_{kk'}^{(A)}(\partial_{k_b}\partial_{k_c}\epsilon_k) +$$

$$\left.\tau_2^{(1)}\tau_2^{(0)}\tau_{1\omega}^{(0)}\int_k [-f_0'(k)]\partial_{k_a}\int_{k'}w_{kk'}^{(A)}v_{0,b}v_{0,c}\right] + (b\leftrightarrow c)^*.$$

We also show the expression for $\chi_{abc}^{(0)}$ for reference although it vanishes. These expressions show that results at finite temperature can be obtained by considering the thermal broadening of the Fermi-Dirac distribution, where the Fermi energy $\epsilon_F$ is replaced by the chemical potential $\mu_{chem}$ with the carrier density fixed. More explicitly, from the following relation $-f'_0(k)=\int d\epsilon[-f'_0(\epsilon;\mu_{chem})]\delta(\epsilon_k-\epsilon_F),$ the second-order conductivity at finite temperature is obtained by $\chi_{abc}(\mu_{chem},T)=\int d\epsilon[-f'_0(\epsilon;\mu_{chem})]\chi_{abc}(\epsilon,T=0).$ Linear Response We also calculate the linear response to obtain responsivities (defined below). From the Boltzmann equation, the linear current response is given by $j_{1,a}(\omega)=\sigma_{ab}E_b(\omega)=-e\int_k v_{0,a}f_1^{scatt},$ leading to the linear conductivity $\sigma_{ab}=\sigma_{ab}^{(0)}+\sigma_{ab}^{(1)},$ $\sigma_{ab}^{(0)}=-e^2\tau_{1\omega}^{(0)}\int_k v_{0,a}\propto_{k_b}f_0(k)=e^2\tau_{1\omega}^{(0)}\int_k v_{0,a}v_{0,b}[-f'_0(k)],$ $\sigma_{ab}^{(1)}=-e^2\tau_{1\omega}^{(1)}\tau_{1\omega}^{(0)}\int_k v_{0,a}\int_{k'}w_{kk'}^{(A)}\propto_{k_b}f_0(k').$ (23)

Graphene-Based Models with Trigonal Lattice Structures

Figure 8C:
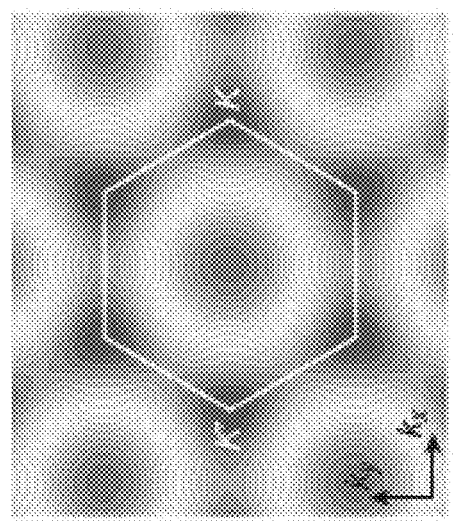
FIG. 8C shows the Brillouin zone and energy contours for the monolayer graphene model of FIG. 8A.
Figure 8B:
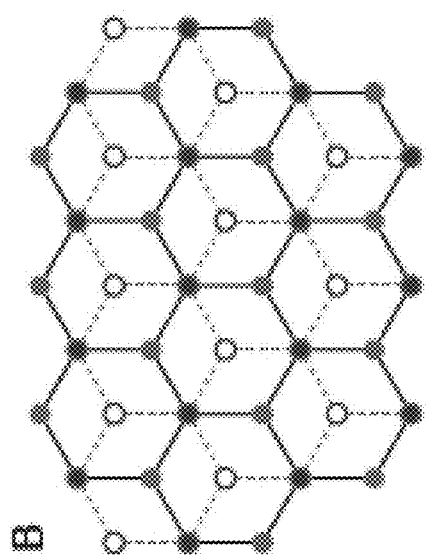
FIG. 8B illustrates the lattice structure and crystal axes of bilayer graphene.
Figure 8A:
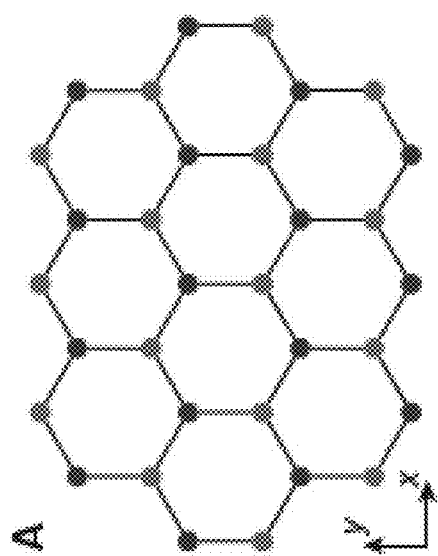
FIG. 8A illustrates the lattice structure and crystal axes of monolayer graphene.

FIGS. 8A-8C illustrate explicit models for evaluating the current response. We consider two graphene-based models, utilizing monolayer and bilayer graphene. FIG. 8A shows the lattice structure of the monolayer graphene along with the crystal axes. FIG. 8B shows the lattice structure of bilayer graphene. The shaded circles depict distinct sublattice sites with different potential energies, and the filled and empty circles correspond to atoms on different layers. Both lattices have reflection planes parallel to the y axis and its symmetry partners under the three-fold rotation. FIG. 8A shows Brillouin zone and energy contours for the monolayer model. With small doping, there are trigonally-warped Fermi surfaces around K and K' points, facing the opposite directions. The bilayer model exhibits the similar Fermi surfaces as the monolayer ones.

The crystalline lattices for the monolayer and bilayer models belong to a crystallographic point group $D_{3h}$ and $C_{3v}$, respectively. Inversion is equivalent to the in-plane two-fold rotation in 2D models, which is absent in the present models. Around K and K' points, $$K = \left(\frac{4\pi}{3\sqrt{3}}, 0\right) \text{ and } K' = \left(-\frac{4\pi}{3\sqrt{3}}, 0\right),$$

the k·p Hamiltonian to second order is $$H_s(k) = \begin{pmatrix} \Delta & svk_{-s} - \lambda k_s^2 \\ svk_s - \lambda k_{-s}^2 & -\Delta \end{pmatrix} \quad (24)$$

$$= [svk_x - \lambda(k_x^2 - k_y^2)]\sigma_x + (vk_y + 2s\lambda k_x k_y)\sigma_y + \Delta\sigma_z,$$

where $k_x$ and $k_y$ are measured from K or K' point, labeled by $s=\pm 1$, and $k_s$ is defined by $k_s=k_x+isk_y$. The energy dispersion of the positive branch is given by $\epsilon_k=\sqrt{v^2k^2+\lambda^2k^4+\Delta^2-2sv\lambda k^3\cos3\theta},$ and the corresponding normalized wavefunction is $$|k,s\rangle = \frac{1}{2\sqrt{\epsilon_k(\epsilon_k+\Delta)}}\{\epsilon_k + \Delta[svk_x - \lambda(k_x^2 - k_x^2)] + i(vk_y + 2s\lambda k_x k_y)\}$$

The Berry curvature is also calculated as $$\Omega_z = -\frac{s\Delta(v^2 - 4\lambda^2 k^4)}{2\epsilon_k^3}.$$

The Hamiltonian Eq. (24) is available to both monolayer and bilayer models, which are shown in FIGS. 8A and 8B, respectively. The Pauli matrix $\sigma_a$ describes the two sublattices for monolayer graphene and two layers for AB (Bernal) stacked bilayer graphene. Another difference is found in which of v and $\lambda$ is dominant, which is explained below. $\Delta$ describes the potential energy difference at the two sublattice sites or layers, which opens a gap to the energy spectrum. We consider the two cases separately below.

Monolayer Graphene

For monolayer graphene, the terms with v dominate those with $\lambda$ ($vk_F \gg \lambda k$-hd $F^2$), where $\lambda$ characterizes the trigonal warping of the Fermi surface. $s=+1$ corresponds to K valley and $s=-1$ to K' valley. The Dirac mass can be induced for example by placing a graphene sheet on a hexagonal boron nitride (hBN) substrate. For a tight-binding model on a honeycomb lattice with the nearest-neighbor hopping amplitude t and the distance between sites a, the velocity v and the trigonal warping $\lambda$ are given by $v=3ta/2$ and $\lambda=3ta^2/8$, respectively.

We assume that the trigonal warping is small and obtain the energy dispersion $\epsilon_k$ to first order in $\lambda$ as $$\epsilon_k = \sqrt{v^2k^2 + \Delta^2} - sv\lambda\frac{k^3}{\sqrt{v^2k^2+\Delta^2}}\cos3\theta_k + O(\lambda^2),$$

where the Fermi wavevector $k_F$ is given by $$k_F = \frac{\sqrt{\epsilon_F^2 - \Delta^2}}{v}.$$

The density of states (DOS) at the Fermi energy is $$D_0 = \frac{\epsilon_F}{2\pi v^2},$$

and $\theta_k$ denotes the polar angle of k. The Fermi surface can be parameterized by $\theta_k$ as $$k(\theta_k) = k_F + s\lambda \frac{k_F^2}{v} \cos 3\theta_k.$$

We use the wavefunction on the Fermi surface to evaluate the scattering rate. The normalized wavefunction on the Fermi surface is given by $$s\lambda \frac{k_F^2}{v} \cos 3\theta_k \cdot \left( \sqrt{\frac{\epsilon_F + \Delta}{2\epsilon_F}}, \frac{(s\cos\theta_k + i\sin\theta_k)(vk_F + i\lambda k_F^2 \sin 3\theta_k)}{\sqrt{2\epsilon_F(\epsilon_F + \Delta)}} \right)^T$$

Also, it is useful to see the Berry curvature on the Fermi surface, which is given by $$\Omega_z = -\frac{sv^2\Delta}{2\epsilon_F^3} + O(\lambda^2).$$

The second-order conductivity is considered in the presence of an elastic impurity scattering. Here, we assume short-ranged random scalar impurities $$V(r) = V_i \sum_j \delta(r - r_j),$$

but restrict scattering within each valley. $V_i$ is the impurity potential strength, $n_i$ is the impurity density, and $r_j$ denotes an impurity position, where the summation is taken over all impurity sites. Then, we obtain the scattering rates for the valley s to first order in $\lambda$ as $$w_{s,kk'}^{(S)} = \frac{\pi n_i V_i^2}{2\epsilon_F^2(\epsilon_F + \Delta)^2} \Big[ |(\epsilon_F + \Delta)^2 + v^2 k_F^2 e^{i(\theta - \theta')}|^2 - \quad (25)$$
$$2s\lambda v k_F^3 (\epsilon_F + \Delta)^2 \sin(\theta - \theta')(\sin 3\theta - \sin 3\theta') \Big] \delta(\epsilon_k - \epsilon_{k'}),$$

$$w_{s,kk'}^{(A)} = -\frac{\pi n_i V_i^3 \Delta k_F^2}{2\epsilon_F^2} \Big\{ s\sin(\theta - \theta') + \lambda \frac{k_F}{v} [\sin(\theta - 4\theta') +$$
$$\sin(4\theta - \theta') - \sin(\theta + 2\theta') + \sin(2\theta + \theta')] \Big\} \delta(\epsilon_k - \epsilon_{k'}),$$

with $\theta = \theta_k$ and $\theta' = \theta_{k'}$ parametrizing the Fermi surface.

In order to obtain the distribution function, we determine the scattering times that satisfy the relation Eq. (16). For the present Hamiltonian, the scattering times are obtained as $$\tau_1^{(0)} = \tau_1^{(1)} = \tau_2^{(1)} = \left( n_i V_i^2 \frac{\epsilon_F^2 + 3\Delta^2}{4v^2 \epsilon_F} \right)^{-1},$$

-continued $$\tau_1^{(1)} = \left( n_i V_i^2 \frac{\epsilon_F^2 + \Delta^2}{2v^2 \epsilon_F} \right)^{-1}.$$

These solutions are obtained to $O(\lambda^0)$, which are enough to evaluate conductivities to order $O(\lambda^1)$ (see the next paragraph). Also, there is no directional dependence in the scattering times at order $\lambda^0$. For clarity, we define $$\tau = \left( n_i V_i^2 \frac{\epsilon_F^2 + 3\Delta^2}{4v^2 \epsilon_F} \right)^{-1},$$

and the dimensionless quantity $$\gamma = \frac{\epsilon_F^2 + 3\Delta^2}{2(\epsilon_F^2 + \Delta^2)} (\leq 1),$$

which are defined to satisfy $\tau_1^{(0)} = \tau_1^{(1)} = \tau_2^{(1)} = \tau$ and $\tau_1^{(1)} = \gamma\tau$.

We calculate the second-order contribution from each valley separately, namely $\chi_{abc} = \chi_{abc}^{(0)} + \chi_{abc}^{(1)}$ with $$\chi_{abc}^{(0)} = \sum_s \chi_{s,abc}^{(0)}, \ \chi_{abc}^{(1)} = \sum_s \chi_{s,abc}^{(1)}.$$

The contributions from each valley s are obtained from Eqs. (21) and (22) at zero temperature as $$\chi_{s,xxx}^{(0)} =$$
$$-\chi_{s,xyy}^{(0)} = -\chi_{s,yxy}^{(0)} = -\chi_{s,yyx}^{(0)} = se^3 \tau^2 v \frac{3\lambda k_F^2 (\epsilon_F^2 + \Delta^2)\gamma}{\pi \epsilon_F^3} \text{Re} \left[ \frac{1}{1 - i\omega\tau} \right],$$

$$\chi_{s,xxy}^{(1)} = \chi_{s,xyx}^{(1)} =$$
$$\chi_{s,yxx}^{(1)} = -\chi_{s,yyy}^{(1)} = 4e^3 \tau^2 v \frac{\tau}{\tilde{\tau}} \text{Re} \left[ \frac{vk_F(2\epsilon_F^2 + \Delta^2)}{(1 - i\omega\tau)^2 \pi \epsilon_F^3} - \gamma \frac{vk_F(\epsilon_F^2 + 2\Delta^2)}{(1 - i\omega\tau)\pi \epsilon_F^3} \right],$$

where the factor of two from spin is multiplied. $D_{3h}$ symmetry means that (i) the imaginary part of the second-order DC conductivity vanishes and (ii) the system does not have second-order response to a circularly-polarized field. We define another scattering time $\tilde{\tau}$, related to $w^{(A)}$ [see Eq. (19)], as $$\tilde{\tau} = \left( \Delta\lambda \frac{n_i V_i^3 k_F^3}{8v^3 \epsilon_F} \right)^{-1}.$$

This quantity measures the amounts of inversion breaking (m) and the Fermi surface warping ($\lambda$). The ratio $\tau/\tilde{\tau}$ becomes $$\frac{\tau}{\tilde{\tau}} = \Delta\lambda \frac{V_i k_F^3}{2v(\epsilon_F^2 + 3\Delta^2)} = \frac{1}{2} \frac{\Delta \cdot V_i k_F^2}{\epsilon_F^2 + 3\Delta^2} \frac{\lambda k_F^2}{vk_F}.$$

Roughly speaking, the ratio is determined by the product of the following dimensionless quantities: inversion breaking $\Delta/\epsilon_F$, the Fermi surface warping $\lambda k_F^2/(vk_F)$, and the impurity strength $V_i k_F^2/\epsilon_F$. We can see from Eq. (25) that the antisymmetric scattering becomes finite when inversion is broken by $\Delta \neq 0$ but it does not require finite Fermi surface warping $\lambda$. However, the second-order response vanishes when the Fermi surface warping is absent. The ratio $\tau/\tilde{\tau}$ measures the amount of the contribution to the second-order response from skew scattering, but not the magnitude of skew scattering itself.

$\chi^{(0)}$ is originated from the absence of time-reversal or inversion symmetry within each valley, resulting from the Fermi surface anisotropy. However, time reversal is preserved with the two valleys, and thus contributions from different valleys cancel. This effect of $\chi^{(0)}$ can be seen in FIGS. 5C and 6C, where the two valleys generates the opposite static velocity V. In contrast, $\chi^{(1)}$ adds up with the two valleys, since this contribution captures the opposite chirality of the wavefunctions around each valley, which is not visible from the Fermi surface shape. Finally, we obtain the nonvanishing elements of the second-order conductivity $$\chi_{xxy} = \chi_{xyx} = \chi_{yxx} = -\chi_{yyy} = -4e^3 v_F \frac{\tau^3}{\tilde{\tau}} \zeta(\omega) \equiv -\chi(\omega), \quad (26)$$

with the average Fermi velocity on the Fermi surface $$v_F = \frac{v^2 k_F}{\epsilon_F},$$

and the dimensionless function $$\zeta(\omega) = \frac{2}{\pi} \text{Re}\left[\gamma \frac{\epsilon_F^2 + 2\Delta^2}{(1-i\omega\tau)\epsilon_F^2} - \frac{2\epsilon_F^2 + \Delta^2}{(1-i\omega\tau)^2 \epsilon_F^2}\right].$$

Here the factor of four in Eq. (26) corresponds to spin and valley degrees of freedom. The finite elements of $\chi_{abc}$ are consistent with $D_{3h}$ symmetry of the lattice.

Linear Conductivity and Responsivity of Monolayer Graphene

To estimate the magnitude of the second-order response and to calculate responsivities, we also calculate the linear conductivity, particularly $\sigma_{s,ab}^{(0)}$. From Eq. (23), we obtain $$\sigma_{s,ab}^{(0)} = 2e^2 \tau_{1\omega}^{(0)} \frac{v^2 k_F^2}{4\pi\epsilon_F} \delta_{ab},$$

for each valley with the spin degrees of freedom included. The linear conductivity is diagonal, and hence we write $$\sigma(\omega) = \sum_s \text{Re}\sigma_{s,aa}^{(0)} = e^2 \tau \frac{v^2 k_F^2}{\pi\epsilon_F} \frac{1}{1+(\omega\tau)^2}.$$

Since the linear conductivity can be written as $\sigma = ne\mu$ with the electron density n and the mobility $\mu$, in low frequencies we find the relation $$\mu = e\tau \frac{v^2}{\epsilon_F}.$$

The electron density is obtained by $n = k_F^2/\pi$.

The short-circuit current responsivity $\Re_I$ is defined as the ratio of the generated DC current $j_2$ to the power of the incident electric field absorbed by the sample. When a sample has a dimension of $L^2$ and the incident field is uniform on the sample, the current responsivity is given by $$R_I \equiv \frac{j_2 L}{j_1 EL^2} = \frac{1}{L} \frac{\chi(\omega)}{\sigma(\omega)}.$$

The dimension L corresponds to either the width or length of a sample, depending on whether the second-order response of interest is longitudinal or transverse to the incident electric field. We also define the voltage responsivity $\Re_V$ as the ratio of the voltage generated by the second-order response to the incident power:

$$R_V \equiv \frac{j_2 L/\sigma(0)}{j_1 EL^2} = \frac{1}{L} \frac{\chi(\omega)}{\sigma(\omega)\sigma(0)}.$$

Both current responsivity $\Re_I$ and voltage responsivity $\Re_V$ depend on the sample dimension L and the ratio $\tau/\tilde{\tau}$. To remove those factors, we define the reduced current responsivity $\eta_I$ and the reduced voltage responsivity $\eta_V$ as follows:

$$R_V = \eta_I \frac{1}{L} \frac{\tau}{\tilde{\tau}},$$

$$R_I = \eta_V \frac{1}{L} \frac{\tau}{\tilde{\tau}}.$$

For the present model, $\eta_I$ and $\eta_V$ are obtained as $$\eta_I = \frac{4\pi e \tau}{k_F} [1 + (\omega\tau)^2] \zeta(\omega),$$

$$\eta_V = \frac{4\pi}{env_F} [1 + (\omega\tau)^2] \zeta(\omega).$$

Bilayer Graphene

Bernal stacked bilayer graphene has $C_{3v}$ symmetry when the two layers have different potential energies. Because of the symmetry, we can use the same Hamiltonian Eq. (24); however, v is treated as a perturbation instead of $\lambda$ for the bilayer graphene case ($\lambda k_F^2 \gg vk_F$), as we can see from a tight-binding Hamiltonian. Treating v as a perturbation, we obtain the energy dispersion $\epsilon_k$ to first order in v as $$\epsilon_k = \sqrt{\lambda^2 k^4 + \Delta^2} - \frac{2sv\lambda k^3}{\sqrt{\lambda^2 k^4 + \Delta^2 \cos 3\theta_k}}.$$

The DOS at the Fermi energy $D_0$ is given by $$D_0 = \frac{\epsilon_F \Delta^2}{\pi k_F^2}.$$

The normalized wavefunction on the Fermi surface to order v is $$|k, s\rangle = \left( \sqrt{\frac{\epsilon_F + \Delta}{2\epsilon_F}}, \frac{(\cos 2\theta_k + is \sin 2\theta_k)(\lambda k_F^2 + iv k_F \sin 3\theta_k)}{\sqrt{2\epsilon_F(\epsilon_F + \Delta)}} \right)^T$$

where $k_F$ is defined by $$k_F = \left( \frac{\epsilon_F^2 - \Delta^2}{\lambda^2} \right)^{1/4}.$$

The Berry curvature on the Fermi surface is $$\Omega_z = \frac{2s\Delta\lambda^2 k_F^2}{\epsilon_F^3} + \frac{2\Delta v \lambda k_F \cos 3\theta}{\epsilon_F^3} + O(v^2).$$

Using the wavefunction, we obtain the symmetric and antisymmetric scattering rates $w^{(S)}$ and $w^{(A)}$, respectively:

$$w_{s,kk'}^{(s)} = \frac{\pi n_i V_i^2}{2\epsilon_F^2(\epsilon_F + \Delta)^2} \Big[ |(\epsilon_F + \Delta)^2 + \lambda^2 k_F^4 e^{2i(\theta - \theta')}|^2 -$$
$$2sv\lambda(\epsilon_F + \Delta)^2 k_F^3 \sin(2\theta - 2\theta')(\sin 3\theta - \sin 3\theta') \Big] \delta(\epsilon_k - \epsilon_{k'}),$$

$$w_{s,kk'}^{(A)} = \frac{\pi n V_i^3 k_F^2 \Delta}{4\epsilon_F^2} \Big\{ s \sin(2\theta - 2\theta') + \frac{v}{2\lambda k_F} [\sin(\theta + 2\theta') -$$
$$\sin(2\theta + \theta') + \sin(2\theta - 5\theta') + \sin(5\theta - 2\theta')] \Big\} \delta(\epsilon_k - \epsilon_{k'}).$$

For the bilayer graphene case, the scattering times become $$\tau_1^{(0)} = \left( \frac{n_i V_i^2(\epsilon_F^2 + \Delta^2)}{4\lambda^2 k_F^2 \epsilon_F} \right)^{-1},$$

$$\tau_1^{(1)} = \tau_2^{(0)} = \tau_2^{(1)} = \left( \frac{n_i V_i^2(\epsilon_F^2 + 3\Delta^2)}{8\lambda^2 k_F^2 \epsilon_F} \right)^{-1},$$

$$\tilde{\tau} = \left( \Delta v \frac{n_i V_i^3}{32\lambda^3 k_F \epsilon_F} \right)^{-1}.$$

We define $\tau$ as $$\tau = \left( \frac{n_i V_i^2(\epsilon_F^2 + \Delta^2)}{4\lambda^2 k_F^2 \epsilon_F} \right)^{-1},$$

resulting in $\tau_1^{(0)} = \tau$ and $\tau_1^{(1)} = \tau_2^{(0)} = \tau_2^{(1)} = \gamma^{-1}\tau$, with the same $\gamma$ for the monolayer graphene case.

The contributions to the second-order conductivity from valley s are obtained from Eqs. (21) and (22) at zero temperature as $$X_{s,xxx}^{(0)} = -X_{s,xyy}^{(0)} = -X_{s,yxy}^{(0)} = -X_{s,yyx}^{(0)} =$$
$$se^3 \tau^2 \frac{2\lambda k_F^2(\epsilon_F + 2\Delta^2)}{\pi \epsilon_F^3 \gamma} \text{Re}\left[ \frac{1}{1 - i\omega \tau} \right],$$

$$X_{s,xxy}^{(1)} = X_{s,xyx}^{(1)} = X_{s,yxx}^{(1)} = -X_{s,yyy}^{(1)} =$$
$$e^3 \tau^2 (2\lambda k_F) \frac{\tau}{\tilde{\tau}} \frac{\lambda k_F^2 \Delta^2}{4\pi \epsilon_F^3 \gamma^2} \text{Re}\left[ \frac{5}{(1 - i\omega\tau)(1 - i\omega\gamma^{-1}\tau)} - \frac{6}{1 - i\omega\tau} \right].$$

For the bilayer graphene model, the ratio $\tau/\tilde{\tau}$ is given by $$\frac{\tau}{\tilde{\tau}} = \Delta v \frac{k_F V_i}{8\lambda(\epsilon_F^2 + \Delta^2)}.$$

As in the monolayer graphene case $\chi_{s,abc}^{(0)}$ from each valley cancels but $\chi_{s,abc}^{(1)}$ adds, leading to the second-order conductivity $$X_{xxy} = X_{xyx} = X_{yxx} = -X_{yyy} = -4e^3 v_F \frac{\tau^3}{\tilde{\tau}} \zeta(\omega) \equiv -X(\omega),$$

where for the bilayer model the average velocity on the Fermi surface $v_F$ is $$v_F = \frac{2\lambda^2 k_F^3}{\epsilon_F},$$

and the dimensionless function $\zeta(\omega)$ becomes $$\zeta(\omega) = \frac{\Delta^2}{8\pi \epsilon_F^2 \gamma^2} \text{Re}\left[ \frac{6}{1 - i\omega\tau} - \frac{5}{(1 - i\omega\tau)(1 - i\omega\gamma^{-1}\tau)} \right].$$

Linear Conductivity and Responsivity of Bilayer Graphene

We also evaluate the linear conductivity $\sigma_{s,ab}^{(0)}$ for each valley s with the spin degrees of freedom included [Eq. (23)]:

$$\sigma_{s,ab}^{(0)} = e^2 \tau_{1\omega}^{(0)} \frac{\lambda^2 k_F^4}{\pi \epsilon_F} \delta_{ab}.$$

As in the monolayer graphene case, we define $$\sigma(\omega) = \sum_s \text{Re}\sigma_{s,aa}^{(0)} = e^2 \tau \frac{\lambda^2 k_F^4}{\pi \epsilon_F} \frac{1}{1 + (\omega\tau)^2}.$$

For low frequencies, the mobility is calculated from the relation $\sigma = ne\mu$ by $$\mu = e\tau \frac{2\lambda^2 k_F^2}{\epsilon_F}.$$

where the electron density is $n = k_F^2/\pi$.

For the bilayer case, the reduced current responsivity becomes $$\eta_I = \frac{X(\omega)}{\sigma(\omega)} = \frac{8\pi e\tau}{k_F}[1+(\omega\tau)^2]\zeta(\omega),$$

and the reduced voltage responsivity is $$\eta_V = \frac{X(\omega)}{\sigma(\omega)\sigma(0)} = \frac{16\pi}{env_F}[1+(\omega\tau)^2]\zeta(\omega).$$

Estimate of Parameters

Parameters for a realistic evaluation are taken and estimated from experiments on monolayer and bilayer graphene. For monolayer graphene on an hBN substrate, the imbalance of the potential energy within a sublattice is induced by the substrate and the lattice mismatch of graphene and hBN creates a superlattice with a periodicity of about 13 nm. In addition to the original (primary) Dirac points, the Moiré superlattice produces new (secondary) superlattice Dirac points, located at a different energy. Those two have different velocities and energy gaps: at ambient pressure, $v=0.94\times10^6$ m/s and $2\Delta=30$ meV for the original Dirac point, and $v=0.5\times10^6$ m/s and $2\Delta=20$ meV for the superlattice Dirac points. The size of the gap depends on the superlattice periodicity and it could be enhanced by interaction. Even at the original Dirac point, the velocity is slightly modified. We consider the original Dirac points instead of the superlattice Dirac points. The latter have the valley degeneracy of six and anisotropic Dirac cones whereas the valley degeneracy of the former is two.

The scattering time is estimated from a transport measurement with a high-quality sample. At 300K, the mobility $\mu\approx90,000$ cm$^2$/V s with the carrier density n=1×10$^{12}$ cm$^{-2}$, which amounts to a scattering time $\tau\approx1.13$ ps. The corresponding frequency is $(2\pi\tau)^{-1}\approx141$ GHz and the mean free path is $\ell\sim v_F\tau\approx1.6$ μm. The Fermi wavelength at n=0.5×10$^{12}$ cm$^{-2}$ is $\lambda_F\approx0.05$ μm, which is still shorter than the mean free path: $\lambda_F\ll\ell$. To estimate the impurity strength, we need to know the impurity concentration. From transport and scanning tunneling microscopy/spectroscopy, we approximate the impurity density as $n_i\approx1\times10^9$ cm$^{-2}$, which results in $V_i\approx2.77\times10^{-13}$ eV cm$^2$ (nV$_i\approx277$ meV at n=1×10$^{12}$ cm$^{-2}$). Since the velocity is only slightly modified from its value without a superlattice structure, we employ the value $\lambda/v=a/4$ obtained from a tight-binding model, where a is the carbon atom spacing, given by a=1.42 Å. Those values yield the ratio $\tau/\tilde{\tau}\approx0.003$ at n=1×10$^{12}$ cm$^{-2}$. In the present calculations, we do not consider the temperature dependence of the parameters or the origin of scattering and inhomogeneity of samples for simplicity, although the scattering time becomes longer in lower temperatures.

For bilayer graphene, high-quality bilayer graphene grown by chemical vapor deposition (CVD) and detached on hBN has a mobility $\mu\approx30,000$ cm$^2$/V s at 300 K. An out-of-plane electric field (displacement field) D opens a band gap of about $2\Delta\approx100$ meV with D≈1.1 V/nm. The coefficient $\lambda=(2m)^{-1}$ is determined by the effective mass m≈0.033m$_e$ (m$_e$: electron mass) and v≈1×10$^5$ m/s. Evaluating at n=1×10$^{12}$ cm$^{-2}$, we find the scattering time $\tau\approx0.96$ ps, corresponding to a frequency $(2\pi\tau)^{-1}\approx166$ GHz and a mean free path $\ell v_F\tau\approx0.35$. We assume an impurity concentration $n_i\approx1\times10^9$ cm$^{-2}$, considering its high mobility, to obtain an impurity strength $V_i\approx1.06\times10^{-13}$ eV cm$^2$ (nV$_i\approx106$ meV at n=1×10$^{12}$ cm$^{-2}$). At a carrier density n=1×10$^{12}$ cm$^{-2}$, we have the ratio $\tau/\tilde{\tau}\approx0.018$.

Figure 9C:
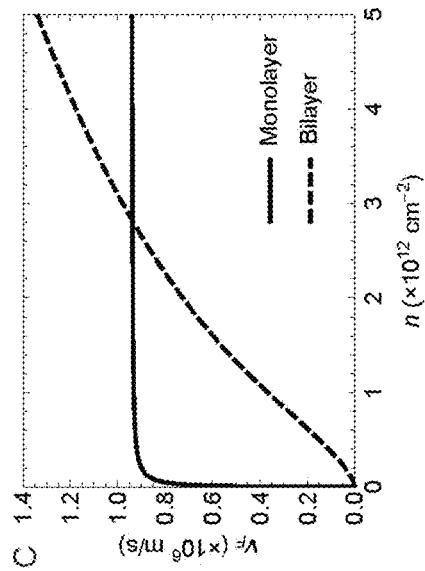
FIG. 9C is a plot of the linear DC conductivity σ at zero temperature for monolayer graphene (sublinearly increasing trace) and bilayer graphene (linearly increasing trace).
Figure 9B:
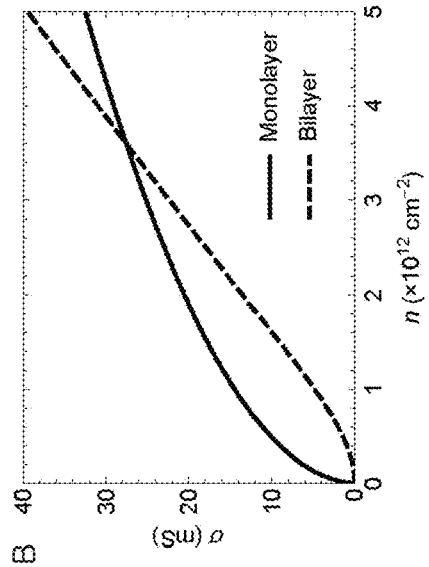
FIG. 9B is a plot of the Fermi velocity $v_F$ for monolayer graphene (flat trace) and bilayer graphene (sloped trace).
Figure 9A:
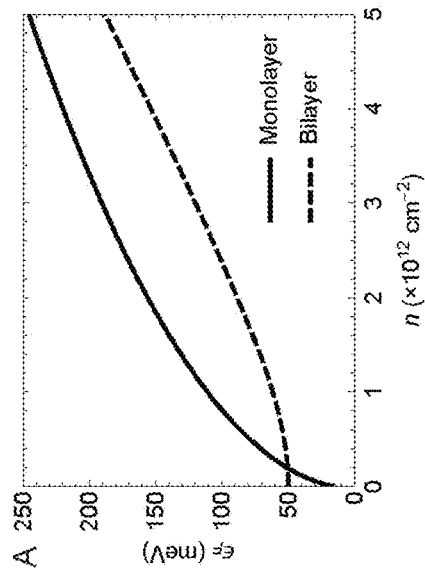
FIG. 9A is a plot of the Fermi energy $\epsilon_F$ for monolayer graphene (upper trace) and bilayer graphene (lower trace).
Figure 10C:
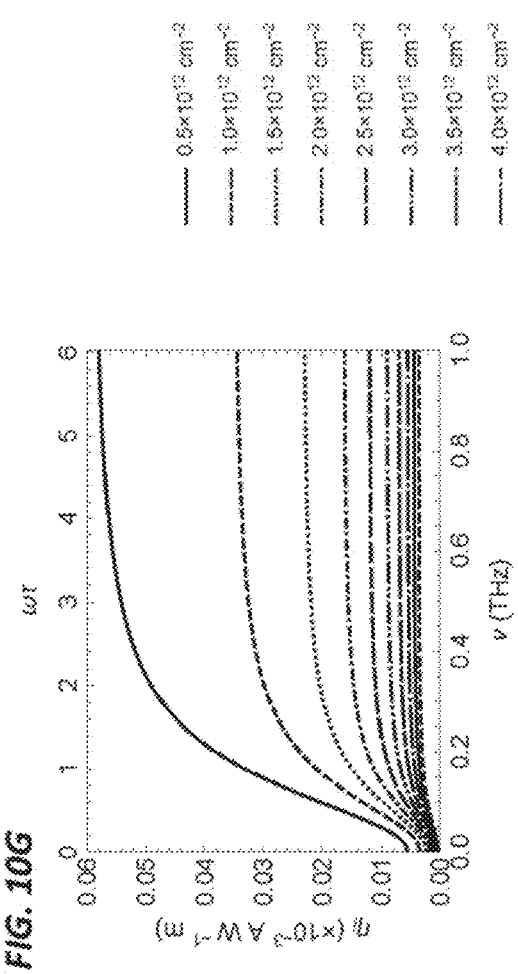
FIG. 10C is a plot of the reduced current responsivity $\eta_I$ of monolayer graphene versus frequency for carrier densities ranging from $0.5 \times 10^{12}$ cm$^{-2}$ to $5 \times 10^{12}$ cm$^{-2}$ and a temperature of zero.
Figure 10G:
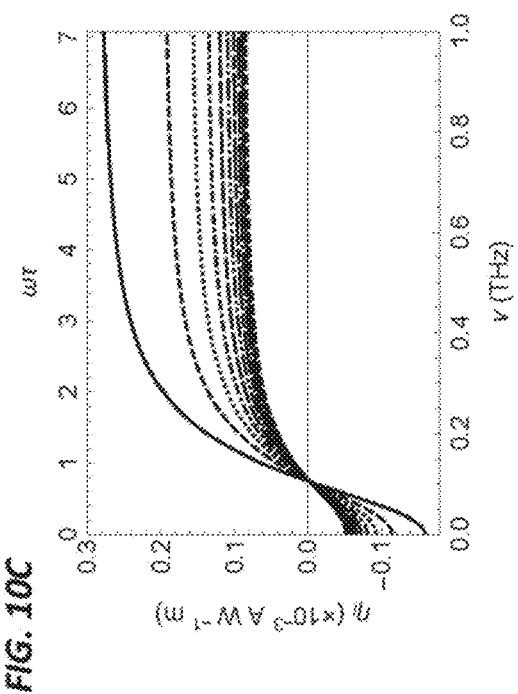
FIG. 10G is a plot of the reduced current responsivity $\eta_I$ of bilayer graphene versus frequency for carrier densities ranging from $0.5 \times 10^{12}$ cm$^{-2}$ to $5 \times 10^{12}$ cm$^{-2}$ and a temperature of zero.
Figure 10D:
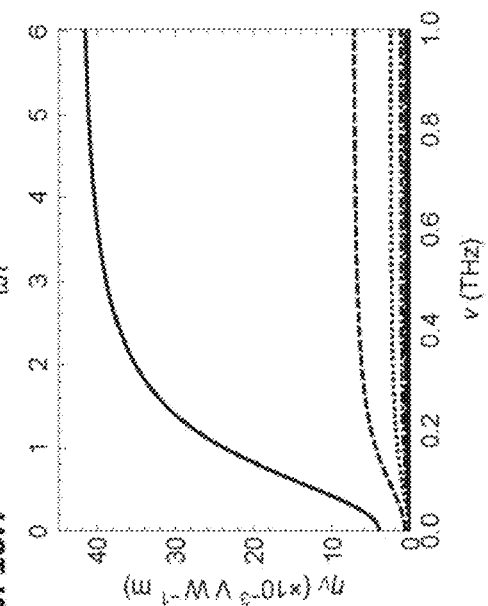
FIG. 10D is a plot of the reduced voltage responsivity $\eta_V$ of monolayer graphene versus frequency for carrier densities ranging from $0.5 \times 10^{12}$ cm$^{-2}$ to $5 \times 10^{12}$ cm$^{-2}$ and a temperature of zero.
Figure 10H:
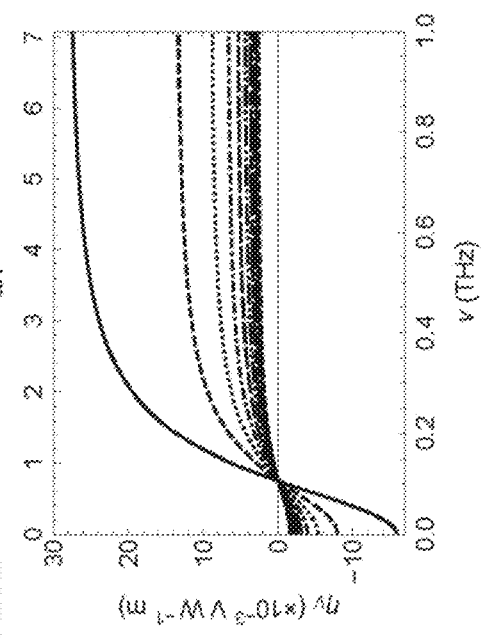
FIG. 10H is a plot of the reduced voltage responsivity $\eta_V$ of bilayer graphene versus frequency for carrier densities ranging from $0.5 \times 10^{12}$ cm$^{-2}$ to $5 \times 10^{12}$ cm$^{-2}$ and a temperature of zero.
Figure 11A:
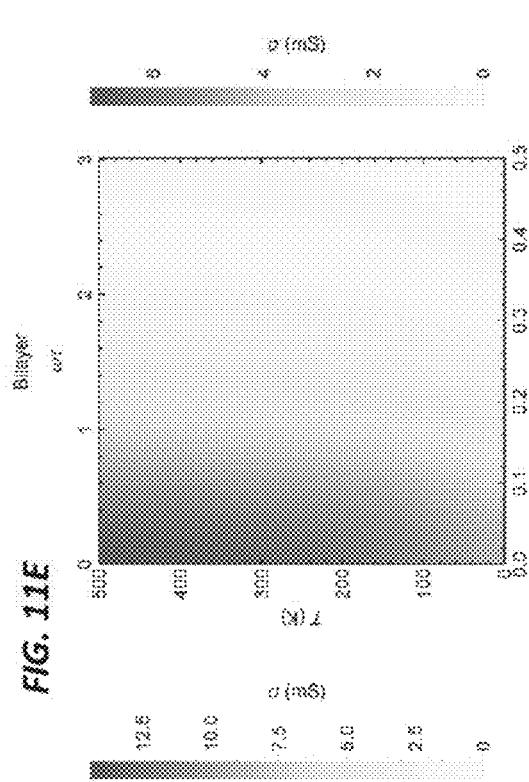
FIG. 11A is a linear-scale plot of the linear conductivity σ of monolayer graphene versus frequency and temperature for a carrier density n=$1 \times 10^{12}$ cm$^{-2}$.
Figure 11B:
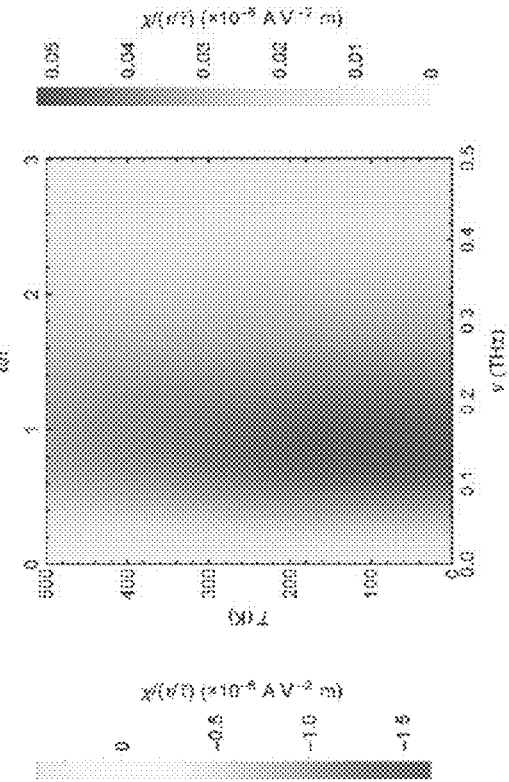
FIG. 11B is a linear-scale plot of the second-order conductivity χ of monolayer graphene versus frequency and temperature for a carrier density n=$1 \times 10^{12}$ cm$^{-2}$.
Figure 11E:
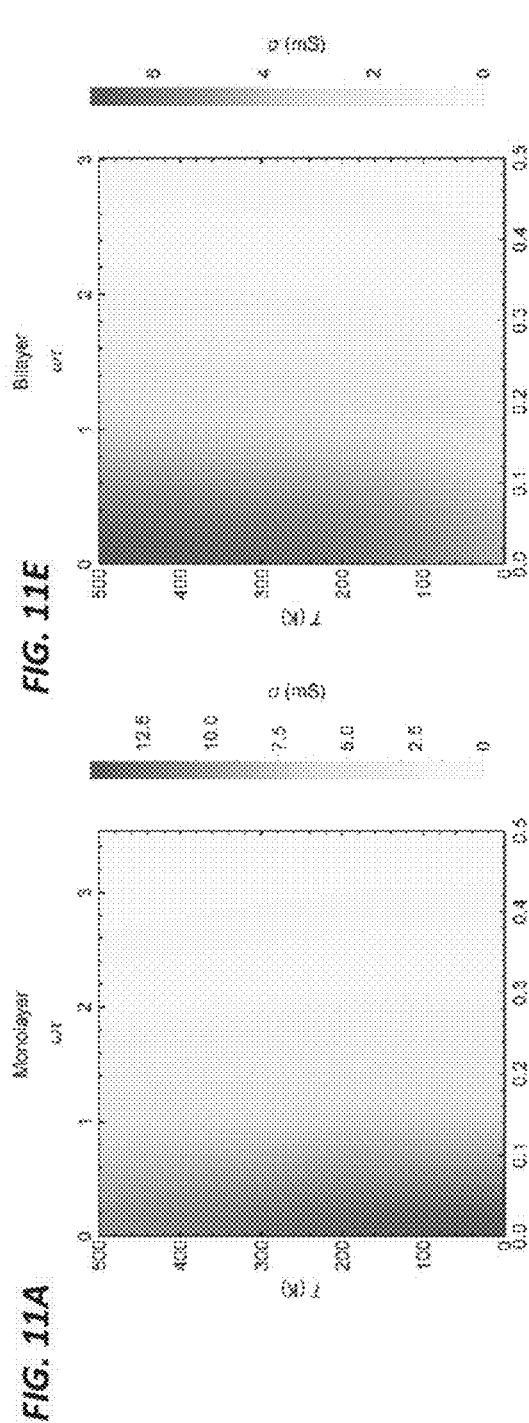
FIG. 11E is a linear-scale plot of the linear conductivity σ of bilayer graphene versus frequency and temperature for a carrier density n=$1 \times 10^{12}$ cm$^{-2}$.
Figure 11F:
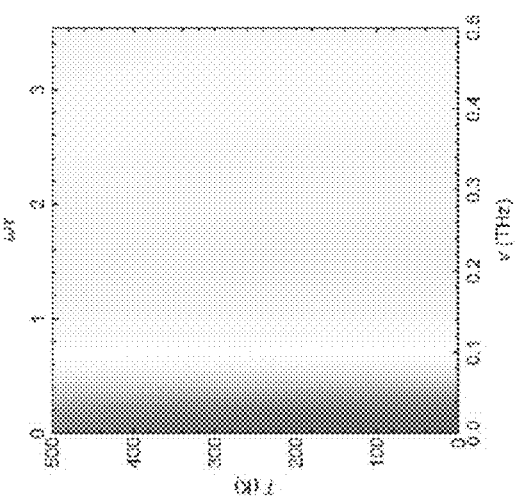
FIG. 11F is a linear-scale plot of the second-order conductivity χ of bilayer graphene versus frequency and temperature for a carrier density n=$1 \times 10^{12}$ cm$^{-2}$.
Figure 11C:
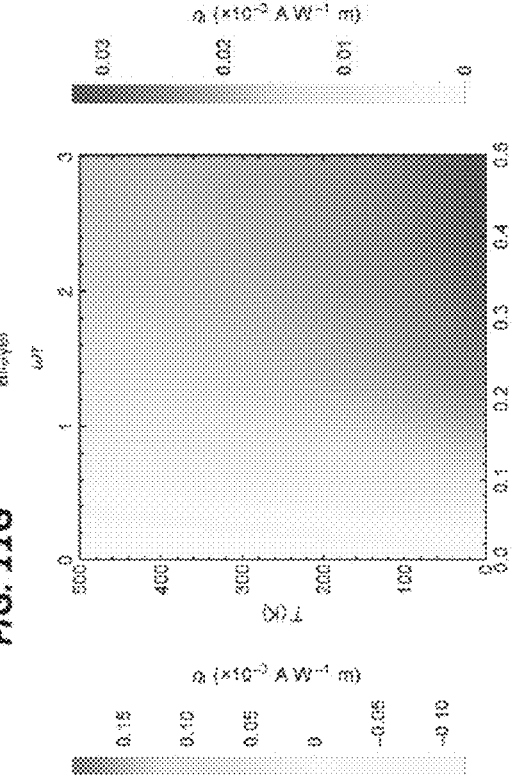
FIG. 11C is a linear-scale plot of the reduced current responsivity $\eta_I$ of monolayer graphene versus frequency and temperature for a carrier density n=$1 \times 10^{12}$ cm$^{-2}$.
Figure 11D:
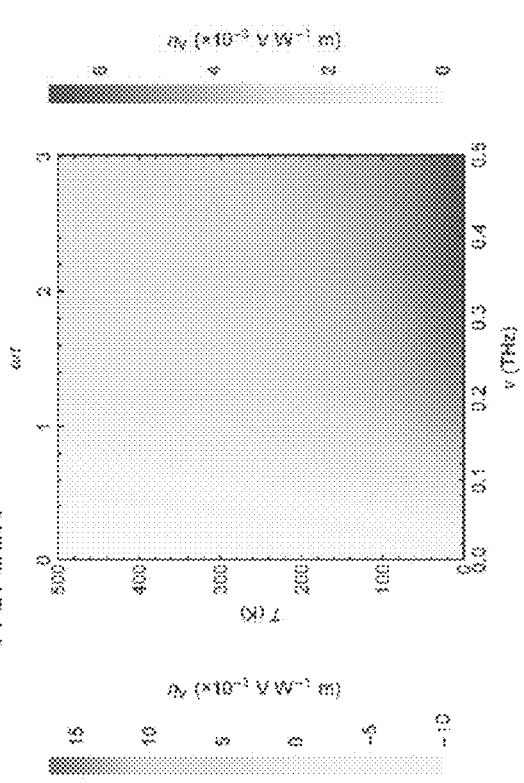
FIG. 11D is a linear-scale plot of the reduced voltage responsivity $\eta_V$ of monolayer graphene versus frequency and temperature for a carrier density n=$1 \times 10^{12}$ cm$^{-2}$.
Figure 11G:
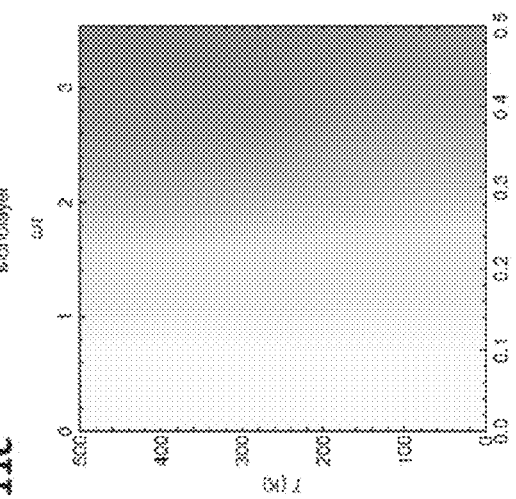
FIG. 11G is a linear-scale plot of the reduced current responsivity $\eta_I$ of bilayer graphene versus frequency and temperature for a carrier density n=$1 \times 10^{12}$ cm$^{-2}$.
Figure 11H:
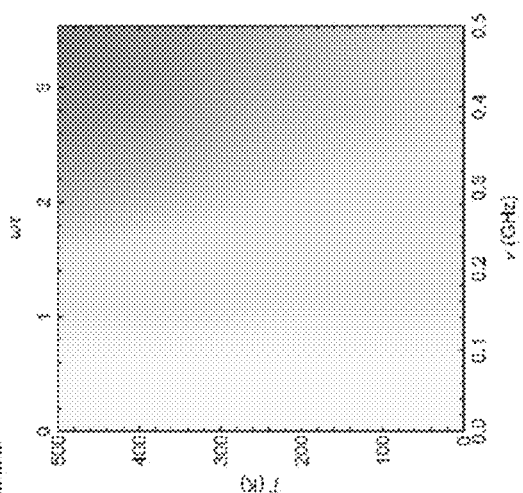
FIG. 11H is a linear-scale plot of the reduced voltage responsivity $\eta_V$ of bilayer graphene versus frequency and temperature for a carrier density n=$1 \times 10^{12}$ cm$^{-2}$.
Figure 12A:
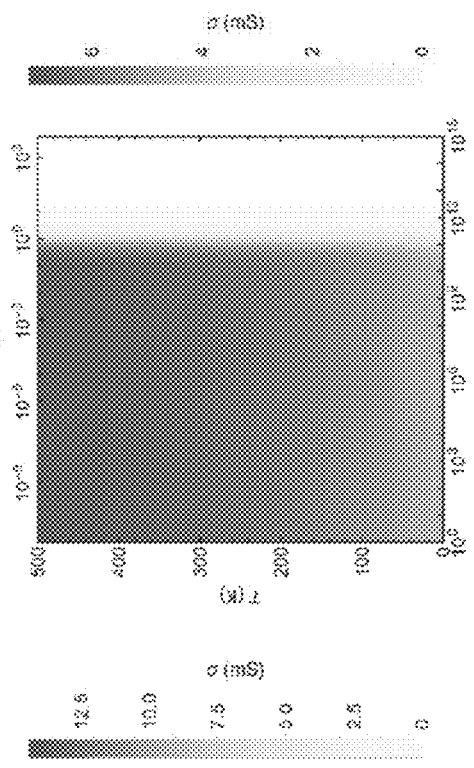
FIG. 12A is a logarithmic-scale plot of the linear conductivity σ of monolayer graphene versus frequency and temperature for a carrier density n=$1 \times 10^{12}$ cm$^{-2}$.
Figure 12B:
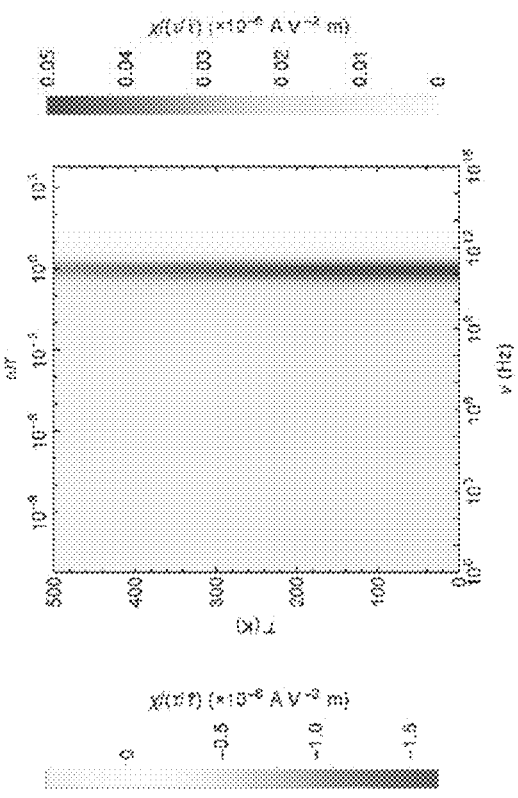
FIG. 12B is a logarithmic-scale plot of the second-order conductivity χ of monolayer graphene versus frequency and temperature for a carrier density n=$1 \times 10^{12}$ cm$^{-2}$.
Figure 12C:
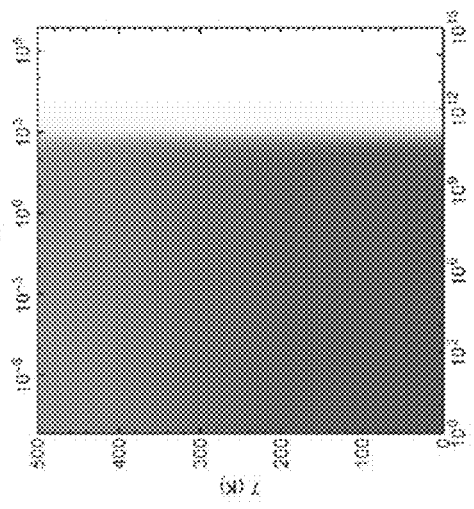
FIG. 12C is a logarithmic-scale plot of the reduced current responsivity $\eta_I$ of monolayer graphene versus frequency and temperature for a carrier density n=$1 \times 10^{12}$ cm$^{-2}$.
Figure 12F:
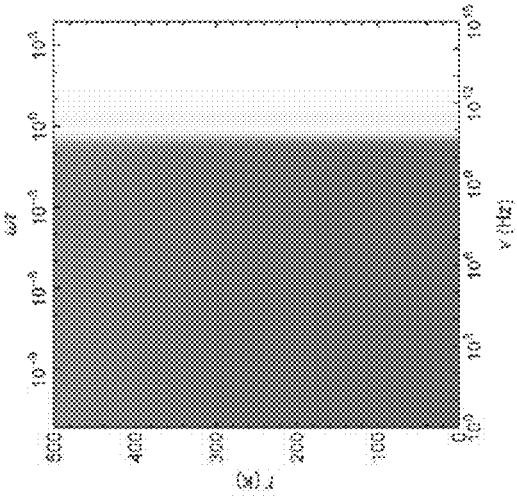
FIG. 12F is a logarithmic-scale plot of the second-order conductivity χ of bilayer graphene versus frequency and temperature for a carrier density n=$1 \times 10^{12}$ cm$^{-2}$.
Figure 12C:
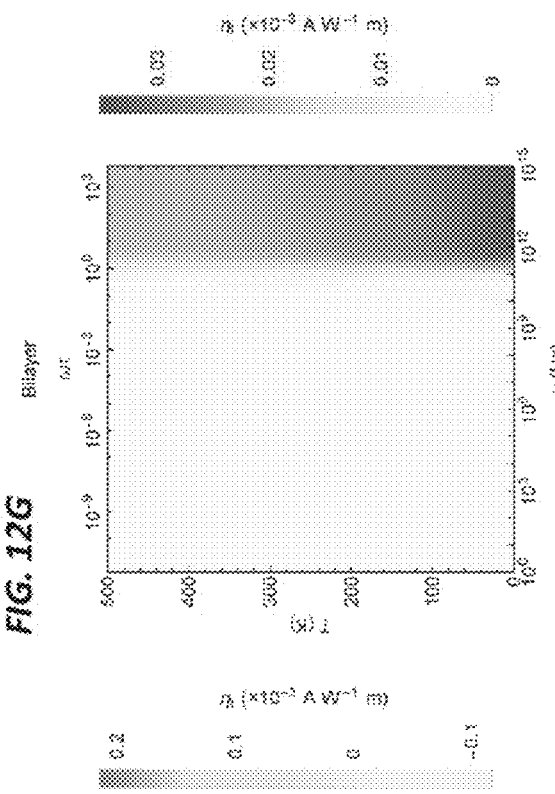
Figure 12G:
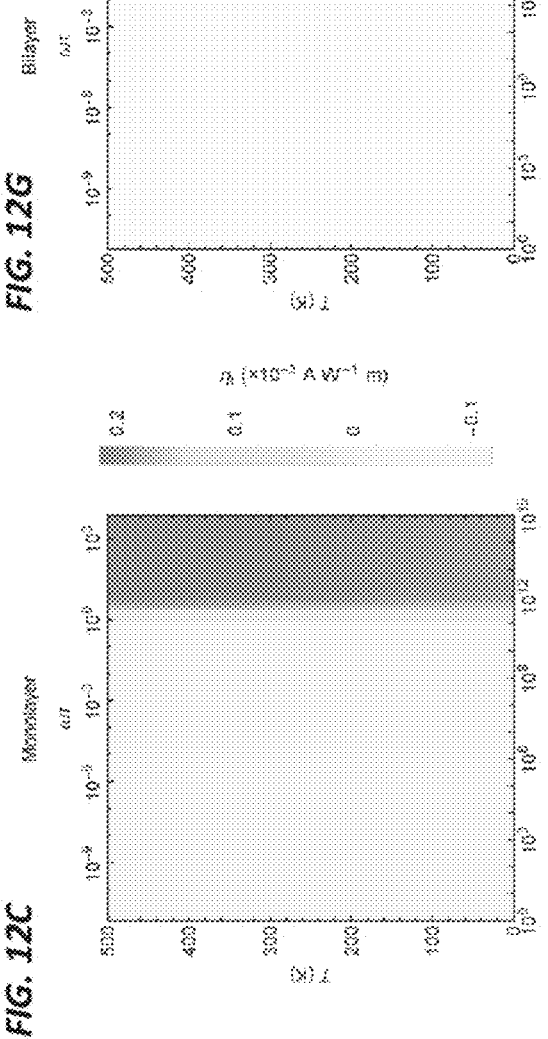
FIG. 12G is a logarithmic-scale plot of the reduced current responsivity $\eta_I$ of bilayer graphene versus frequency and temperature for a carrier density n=$1 \times 10^{12}$ cm$^{-2}$.
Figure 12D:
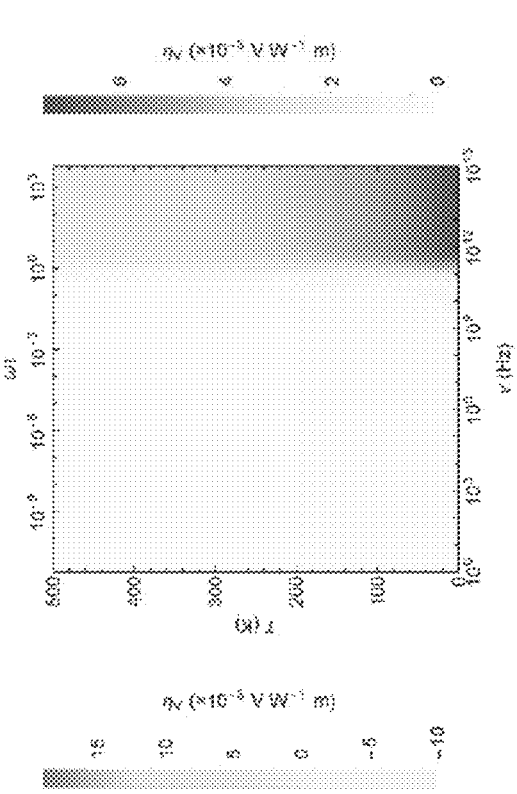
FIG. 12D is a logarithmic-scale plot of the reduced voltage responsivity $\eta_V$ of monolayer graphene versus frequency and temperature for a carrier density n=$1 \times 10^{12}$ cm$^{-2}$.
Figure 12H:
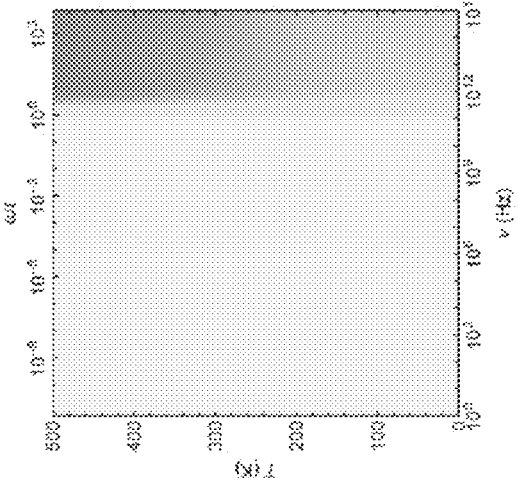
FIG. 12H is a logarithmic-scale plot of the reduced voltage responsivity $\eta_V$ of bilayer graphene versus frequency and temperature for a carrier density n=$1 \times 10^{12}$ cm$^{-2}$.

FIGS. 9A, 9B, and 9C show the carrier density dependence of $\epsilon_F$, $v_F$, and $\sigma(0)$ at zero temperature, respectively, for the parameter values immediately above.

FIGS. 10A-10H show the frequency dependence of $\sigma$, $\chi$, $\eta_I$, and $\eta_V$ for monolayer graphene (FIGS. 10A-10D) and bilayer graphene (FIGS. 10E-10H) models. Different traces represent different carrier densities, which range from 0.5× 10$^{12}$ cm$^{-2}$ to 5×10$^{12}$ cm$^{-2}$, and the temperature is set to be zero. See above for the values of the parameters for each model.

FIGS. 11A-11H and 12A-12H show the frequency and temperature dependence of the response on linear and logarithmic scales, respectively. The scattering times used for the calculations are those at 300 K. The scattering time becomes longer in lower temperature, which makes the linear conductivity $\sigma$, the second-order conductivity $\chi$, and the reduced current responsivity $\eta_I$ larger, whereas the low- and high-frequency values of the reduced voltage responsivity $\eta_V$ barely change. The carrier density is fixed at n=1×10$^{12}$ cm$^{-2}$. FIGS. 11A-11D and 12A-12D correspond to the monolayer graphene model and FIGS. 11E-11H and 12E-12H correspond to the bilayer graphene model. We assume that the scattering time i is a constant independent of temperature; see above for the values of parameters.

Surface State of a Topological Insulator

A surface state of a topological insulator also lacks inversion and thus hosts the rectification effect. Here, we take an example of the surface state of the topological insulator Bi$_2$Te$_3$, where the Hamiltonian is $$H(k) = v(k_x\sigma_y - k_y\sigma_x) + \frac{\lambda}{2}(k_+^3 + k_-^3)\sigma_z,$$

leading to the energy spectrum $$\epsilon_k = \sqrt{v^2k^2 + \lambda^2k^6\cos^23\theta}.$$

The origin k=0 is located at Γ point and the k$_x$ axis is parallel to ΓK line. Unlike the previous two cases based on graphene, a topological insulator has a single Dirac spectrum centered at Γ point. Furthermore, the topology of the wavefunction in the bulk prohibits a mass gap of the surface states. In this case, a surface breaks inversion by itself and the symmetry is C$_{3v}$.

For the present Hamiltonian, short-ranged impurities without momentum dependence do not produce finite w$^{(4)}$, nor does the second-order response. This issue can be circumvented instead by considering Coulomb impurities, where the impurity potential is inversely proportional to the distance from the impurity position: $V(r)\propto\Sigma_j|r-r_j|^{-1}$. Assuming that the hexagonal warping of the Fermi surface is small, the matrix element of the Coulomb impurity potential on the Fermi surface can be expressed as $$V_{kk'} = \frac{V_c}{\left|\sin\left(\frac{\theta-\theta'}{2}\right)\right|}.$$

Then, we obtain the scattering rates $$w_{kk'}^{(S)} = \frac{2\pi n_i V_c^2}{\tan^2\left(\frac{\theta-\theta'}{2}\right)} \delta(\epsilon_k - \epsilon_{k'}),$$

$$w_{kk'}^{(A)} \approx$$

$$\frac{8\pi n_i V_c^3 \epsilon_F^3}{v^5} \lambda c_1 \mathrm{sgn}\left[\sin\left(\frac{\theta-\theta'}{2}\right)\right] \cos\left(\frac{\theta-\theta'}{2}\right)(\cos 3\theta - \cos 3\theta')\delta(\epsilon_k - \epsilon_{k'}),$$

with the numerical factor $c_1 \approx 0.93$ obtained from the numerical integration over momenta.

Since there is a single Fermi surface and time-reversal symmetry relates the Fermi surface with itself, $\chi^{(0)}$ vanishes with the single Fermi surface. A finite second-order conductivity can be found in $x^{(1)}$ as follows:

$$X_{xxy}^{(1)} = X_{xyx}^{(1)} = X_{yxx}^{(1)} = -X_{yyy}^{(1)} \approx e^3 v \frac{\tau^3}{\bar{\tau}} \mathrm{Re}\left[\frac{c_1}{1-i\omega\tau} + \frac{c_2}{(1-i\omega\tau)^2}\right].$$

Here, we assume for simplicity the constant scattering time $\tau \approx (2\pi D_0 n_i V_c^2)^{-1}$ obtained from $w^{(S)}$, and the scattering time originated from $w^{(A)}$ is defined by $$\bar{\tau}^{-1} = \lambda \frac{2 n_i V_C^3 \epsilon_F^4}{\pi v^7}.$$

The two numerical factors $c_1 \approx 0.87$ and $c_2 \approx 0.14$ are evaluated by numerical integrations.

CONCLUSION

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize or be able to ascertain, using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A current rectifier comprising:
    an antenna to receive an alternating current (AC) electric field;
    a noncentrosymmetric material, in electrical communication with the antenna, to generate a direct current (DC) current via a second-order nonlinear response by the noncentrosymmetric material to the AC electric field received by the antenna; and
    a pair of electrodes, in electrical communication with the noncentrosymmetric material, to conduct the DC current,
    wherein the current rectifier does not include or form a diode.

2. The current rectifier of claim 1, wherein the AC electric field oscillates at a frequency from about 0.1 THz to about 10 THz.

3. The current rectifier of claim 1, wherein the AC electric field oscillates in a first direction in a plane of the noncentrosymmetric material and the DC current flows from the noncentrosymmetric material in a second direction orthogonal to the first direction and in the plane of the noncentrosymmetric material.

4. The current rectifier of claim 1, wherein the AC electric field oscillates in a first direction in a plane of the noncentrosymmetric material and the DC current flows from the noncentrosymmetric material in the first direction.

5. The current rectifier of claim 1, wherein the noncentrosymmetric material lacks symmetry in a direction perpendicular to a plane of the noncentrosymmetric material.

6. The current rectifier of claim 1, wherein the noncentrosymmetric material has a band gap of about 26 meV at room temperature.

7. The current rectifier of claim 1, wherein the noncentrosymmetric material is configured to generate the DC current from the AC electric field at room temperature.

8. The current rectifier of claim 1, wherein the noncentrosymmetric material comprises a graphene monolayer disposed on a dielectric layer that breaks an inversion symmetry of the graphene monolayer.

9. The current rectifier of claim 1, wherein the noncentrosymmetric material comprises a graphene bilayer and further comprising:
    a first insulator layer disposed on a first side of the graphene bilayer;
    a first gate electrode, on a far side of the first insulator layer from the graphene bilayer, to apply a first gate voltage to the graphene bilayer;
    a second insulator layer disposed on a second side of the graphene bilayer opposite the first side of the graphene bilayer; and
    a second gate electrode, on a far side of the second insulator layer from the graphene bilayer, to apply a second gate voltage to the graphene bilayer, the first gate voltage and the second gate voltage breaking an inversion symmetry of the graphene bilayer.

10. The current rectifier of claim 1, wherein the noncentrosymmetric material comprises a transition metal dichalcogenide.

11. A method of rectifying current without a diode, the method comprising:
    receiving an alternating current (AC) electric field with an antenna;
    coupling the AC electric field from the antenna into a noncentrosymmetric material that generates a direct current (DC) current via a second-order nonlinear response to the AC electric field received by the antenna; and
    conducting the DC current with a pair of electrodes in electrical communication with the noncentrosymmetric material.

12. The method of claim 11, wherein the AC electric field oscillates at a frequency from about 0.1 THz to about 10 THz.

13. The method of claim 11, wherein the AC electric field oscillates in a first direction in a plane of the noncentrosymmetric material and the DC current flows from the noncentrosymmetric material in a second direction orthogonal to the first direction and in the plane of the noncentrosymmetric material.

14. The method of claim 11, wherein the AC electric field oscillates in a first direction in a plane of the noncentrosymmetric material and the DC current flows from the noncentrosymmetric material in the first direction.

15. The method of claim 11, wherein the noncentrosymmetric material lacks symmetry in a direction perpendicular to a plane of the noncentrosymmetric material.

16. The method of claim 11, wherein the noncentrosymmetric material has a band gap of about 26 meV at room temperature.

17. The method of claim 11, wherein the noncentrosymmetric material generates the DC current from the AC electric field at room temperature.

18. The method of claim 11, wherein the noncentrosymmetric material comprises a graphene monolayer disposed on a dielectric layer that breaks a symmetry of the graphene monolayer.

19. The method of claim 11, wherein the noncentrosymmetric material comprises a graphene bilayer and further comprising:
    applying an electric field to the graphene bilayer to break a symmetry of the graphene bilayer.

20. The method of claim 11, wherein the noncentrosymmetric material comprises a transition metal dichalcogenide.

* * * * *